United States Patent [19]

Miki et al.

[11] Patent Number: 4,975,094

[45] Date of Patent: Dec. 4, 1990

[54] ANTHRAPYRIDONE COMPOUNDS HAVING VINYLSULFONE TYPE FIBER REACTIVE GROUP THROUGH TRIAZINYL BRIDGING GROUP

[75] Inventors: Masayuki Miki, Ashiya; Kingo Akahori, Toyonaka; Yutaka Kayane, Ibaraki; Naoki Harada, Suita; Takashi Omura, Kobe, all of Japan

[73] Assignee: Sumitomo Chemical Company, Limited, Osaka, Japan

[21] Appl. No.: 390,278

[22] Filed: Aug. 7, 1989

[30] Foreign Application Priority Data

Aug. 26, 1988 [JP] Japan ................................ 63-212705

[51] Int. Cl.[5] ...................... C07D 253/04; D60P 3/60; C90B 62/54; C14C 9/00

[52] U.S. Cl. ........................................... 8/537; 8/547; 252/8.7; 544/188

[58] Field of Search .............. 544/212; 546/76; 8/537, 8/547; 252/8.7; 549/188

[56] References Cited

U.S. PATENT DOCUMENTS

| | | | |
|---|---|---|---|
| 3,035,058 | 5/1962 | Guenthardi | 546/76 |
| 3,416,875 | 12/1968 | Ponzini et al. | 8/547 |

FOREIGN PATENT DOCUMENTS

| | | | |
|---|---|---|---|
| 1220189 | 5/1960 | France | 544/188 |
| 1222835 | 6/1960 | France | 544/188 |
| 365471 | 12/1962 | Switzerland . | |
| 167916 | 2/1965 | U.S.S.R. . | |
| 903727 | 8/1962 | United Kingdom | 8/537 |
| 907242 | 10/1962 | United Kingdom . | |

*Primary Examiner*—Mukund J. Shah
*Assistant Examiner*—E. C. Ward
*Attorney, Agent, or Firm*—Stevens, Davis, Miller & Mosher

[57] ABSTRACT

Anthrapyridone compounds of the formula,

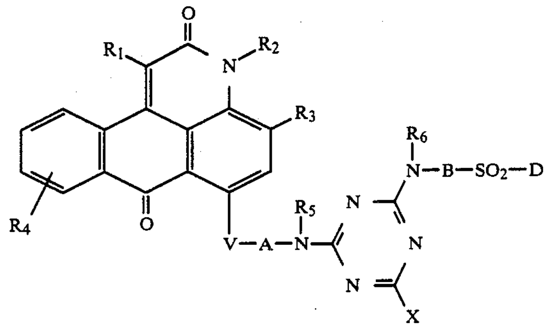

wherein $R_1$ is hydrogen, benzoyl, acetyl or alkyloxycarbonyl, $R_2$ is hydrogen or alkyl, $R_3$ is hydrogen, halogen, sulfo, phenoxy, phenylthio or alkoxy, $R_4$ is hydrogen, halogen or sulfo, $R_5$ and $R_6$ are each hydrogen or alkyl, V is —O—, —S— or $$-\underset{}{N}(R_7)-$$

in which $R_7$ is hydrogen, acetyl or alkyl, B is phenylene or naphthylene, D is vinyl or $-CH_2CH_2L$ such as $-CH_2CH_2OSO_3H$, A is a divalent group, and X is halogen, quaternary ammonium, pyridinio, amino or a $$-N(R_6)-B-SO_2-D$$

like group, which are useful for dyeing or printing fiber materials with superior dyeing performance.

12 Claims, No Drawings

ANTHRAPYRIDONE COMPOUNDS HAVING VINYLSULFONE TYPE FIBER REACTIVE GROUP THROUGH TRIAZINYL BRIDGING GROUP

The present invention relates to an anthrapyridone compound, a process for producing the same and a process for dyeing or printing fiber materials therewith.

More specifically, the present invention relates to an anthrapyridone compound having a so-called vinyl-sulfone type fiber reactive group through a substituted triazinyl bridging group, which is useful for dyeing or printing fiber materials.

Anthrapyridone reactive dye compounds such as one having the following formula,

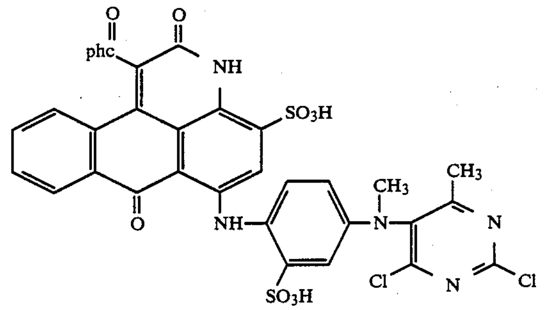

are disclosed in Published Examined Japanese Patent Application No. 7027/1963.

However, these existing anthrapyridone fiber reactive dyes become difficult to meet all needs of the dye consumers with recent changes in the technical and economical situations of dye industry. For example, they are still waiting for improvement with respect to dyeing properties which are fundamental conditions for the dye and are in high demand in recent years.

The present inventors have made extensive studies to find an anthrapyridone compound meeting the needs described above, and found that this object can be accomplished by providing an anthrapyridone compound having a specific chromophore and a so-called vinyl-sulfone type fiber reactive group through a specific substituted triazinyl bridging group.

The present invention provides an anthrapyridone compound of the formula (I), (I)

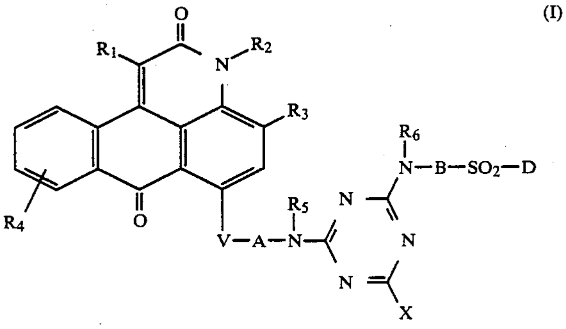

wherein $R_1$ is hydrogen, unsubstituted or substituted benzoyl, acetyl or alkyloxycarbonyl; $R_2$ is hydrogen or unsubstituted or substituted alkyl; $R_3$ is hydrogen, halo, sulfo, unsubstituted or substituted phenoxy, unsubstituted or substituted phenylthio or alkoxy; $R_4$ is hydrogen, halo or sulfo; $R_5$ and $R_6$ are independently each hydrogen or unsubstituted or substituted alkyl; V is —O—, —S— or

in which $R_7$ is hydrogen, acetyl or unsubstituted or substituted alkyl; B is phenylene unsubstituted or substituted once or twice by methyl, ethyl, methoxy, ethoxy, chloro, bromo, carboxy, sulfo or nitro, or naphthylene unsubstituted or substituted by sulfo; D is vinyl or $—CH_2CH_2L$ in which L is a group capable of being split by the action of an alkali; A is a divalent group of the following formula (1), (2), (3), (4), (5) or (6), the formula (1) being (1)

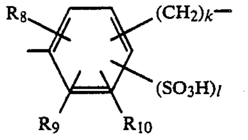

wherein $R_8$, $R_9$ and $R_{10}$ are independently each hydrogen, methyl, ethyl, methoxy, ethoxy, halo or carboxy, k is 0 or 1 and l is 0, 1 or 2, the formula (2) being (2)

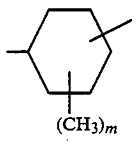

wherein m is 0, 1, 2 or 3, the formula (3) being $$-(CH_2)_n- \qquad (3)$$

wherein n is an integer of 2 to 6, the formula (4) being (4)

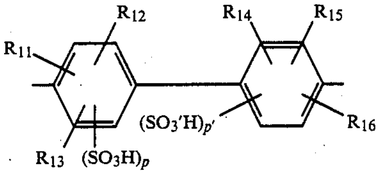

wherein $R_{11}$, $R_{12}$, $R_{13}$, $R_{14}$, $R_{15}$ and $R_{16}$ are independently each hydrogen, methyl, ethyl, methoxy, ethoxy, halo or carboxy, and p and p' are each 0, 1 or 2, provided that the sum of p and p' is 1 or 2, the formula (5) being (5)

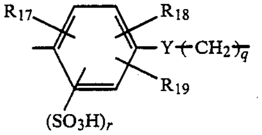

wherein $R_{17}$, $R_{18}$ and $R_{19}$ are independently each hydrogen, methyl, ethyl, methoxy, ethoxy, halo or carboxy, Y is —O—, —S—, $$-\underset{|}{\overset{R_{20}}{N}}- \quad \text{or} \quad -\underset{|}{\overset{R_{21}}{N}}-CO-$$

in which $R_{20}$ and $R_{21}$ are independently each hydrogen or unsubstituted or substituted alkyl, q is an integer of 2 to 6, and r is 0, 1 or 2 and the formula (6) being

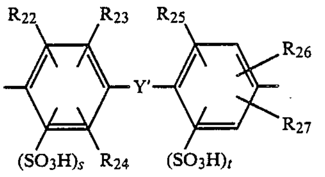

(6)

wherein $R_{22}$, $R_{23}$, $R_{24}$, $R_{25}$, $R_{26}$ and $R_{27}$ are independently each hydrogen, methyl, ethyl, methoxy, ethoxy, halo or carboxy, Y' is —O—, —S—, $$-\overset{R_{28}}{N}- \quad \text{or} \quad -\overset{R_{29}}{N}-CO-$$

in which $R_{28}$ and $R_{29}$ are independently each hydrogen or unsubstituted or substituted alkyl, and s and t are each 0, 1 or 2; and X is fluoro, chloro or a group of the following formula (7), (8), (9) or (10),
the formula (7) being $$-{}^{\oplus}N(R_{30})(R_{31})(R_{32}) \qquad (7)$$

wherein $R_{30}$, $R_{31}$ and $R_{32}$ are independently each unsubstituted or substituted alkyl,
the formula (8) being

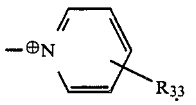

(8)

wherein $R_{33}$ is hydrogen, halo, cyano, hydroxy, unsubstituted or substituted alkyl, vinyl, carbamoyl, sulfo or carboxy,
the formula (9) being $$-N(R_{34})(R_{35}) \qquad (9)$$

wherein $R_{34}$ and $R_{35}$ are independently each hydrogen, alkyl, phenyl, naphthyl or benzyl, the alkyl, phenyl, naphthyl and benzyl being unsubstituted or substituted, and the formula (10) being $$-\overset{R_{36}}{N}-B'-SO_2-D' \qquad (10)$$

wherein $R_{36}$ is hydrogen or unsubstituted or substituted alkyl, B' is phenylene unsubstituted or substituted once or twice by methyl, ethyl, methoxy, ethoxy, chloro, bromo, carboxy, sulfo or nitro, or naphthylene unsubstituted or substituted by sulfo, and D' is vinyl or —$CH_2CH_2L$ in which L is as defined hereinabove; with the proviso that at least one of $R_1$, $R_3$, A and B is or has sulfo.

The present invention also provides a process for producing the anthrapyridone compound of the formula (I), which comprises reacting a compound of the formula (II), a compound of the formula (III) and cyanuric chloride or fluoride in an optional order, if necessary, followed by reaction with any of compounds of the formula (IV) to (VII),
the formula (II) being

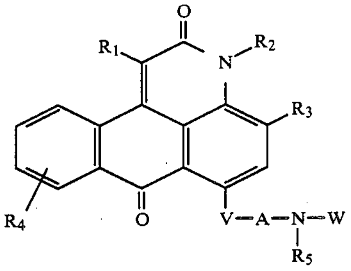

(II)

wherein $R_1$, $R_2$, $R_3$, $R_4$, $R_5$, V and A are as defined above, and W is hydrogen or an amino-protecting group,
the formula (III) being $$H\overset{R_6}{N}-B-SO_2-D \qquad (III)$$

wherein $R_6$, B and D are as defined above,
the formula (IV) being $$N(R_{30})(R_{31})(R_{32}) \qquad (IV)$$

wherein $R_{30}$, $R_{31}$ and $R_{32}$ are as defined above,
the formula (V) being

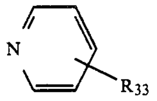

(V)

wherein $R_{33}$ is as defined above,
the formula (VI) being $$HN(R_{35})-R_{34} \qquad (VI)$$

wherein $R_{34}$ and $R_{35}$ are as defined above, and the formula (VII) being $$H\overset{R_{36}}{N}-B'-SO_2-D' \qquad (VII)$$

wherein $R_{36}$, B' and D' are as defined above.

The present invention further provides a process for dyeing or printing fiber materials, which comprises using the anthrapyridone compound of the formula (I).

In the above formula (I), the benzoyl represented by $R_1$ includes those unsubstituted or substituted once or twice by $C_1$–$C_4$ alkoxy, sulfo, carboxy, chloro or $C_1$–$C_4$ alkyl, and the alkyl moiety of the alkyloxycarbonyl represented thereby has preferably 1 to 4 carbon atoms. Preferred examples of those represented by $R_1$ are hydrogen, acetyl, benzoyl, 2-, 3- or 4-sulfobenzoyl, 2-, 3- or 4-chlorobenzoyl, 2-, 3- or 4-methoxybenzoyl, 2-, 3- or 4-ethoxybenzoyl, 2-, 3- or 4-methylbenzoyl, 2-, 3- or 4-ethylbenzoyl, 2-, 3- or 4-carboxybenzoyl and the like.

The unsubstituted or substituted alkyl represented by $R_2$ includes those having 1 to 4 carbon atoms, which may be unsubstituted or substituted by hydroxy. Preferred examples of those represented by $R_2$ are hydrogen, methyl, ethyl, hydroxyethyl or the like.

Preferred examples of the halo represented by $R_3$ are chloro and bromo. The phenoxy and phenylthio represented thereby include those unsubstituted or substituted once or twice by $C_1$–$C_4$ alkoxy, sulfo, carboxy, chloro or $C_1$–$C_4$ alkyl, respectively, and the alkoxy represented thereby includes those having 1 to 4 carbon atoms. Preferred examples of those represented by $R_3$ are hydrogen or sulfo.

The unsubstituted or substituted alkyl represented by $R_5$ and $R_6$ includes those disclosed in Published Unexamined Japanese Patent Application No. 176355/1984. Among them, preferred examples of those represented by $R_5$ are hydrogen and methyl, and those represented by $R_6$ are hydrogen, methyl and ethyl.

Preferred examples of those represented by V are —S— or —NH—.

Examples of those represented by B and B' are as follows:

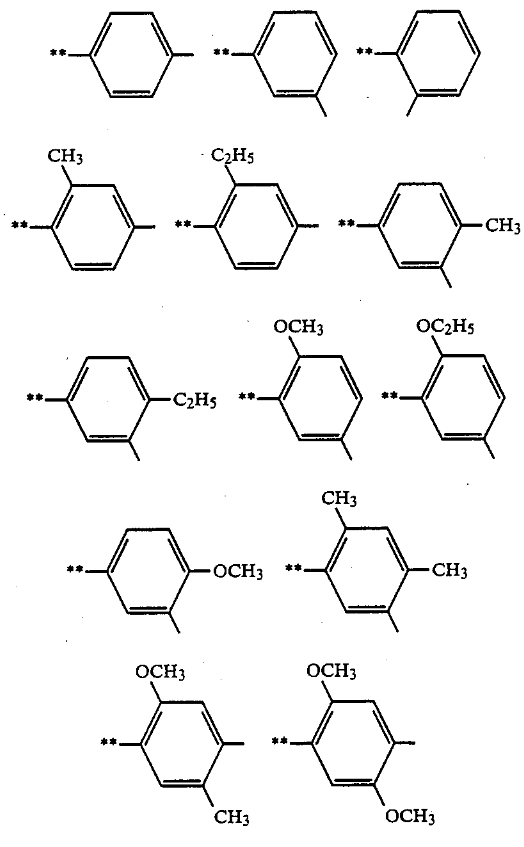

-continued

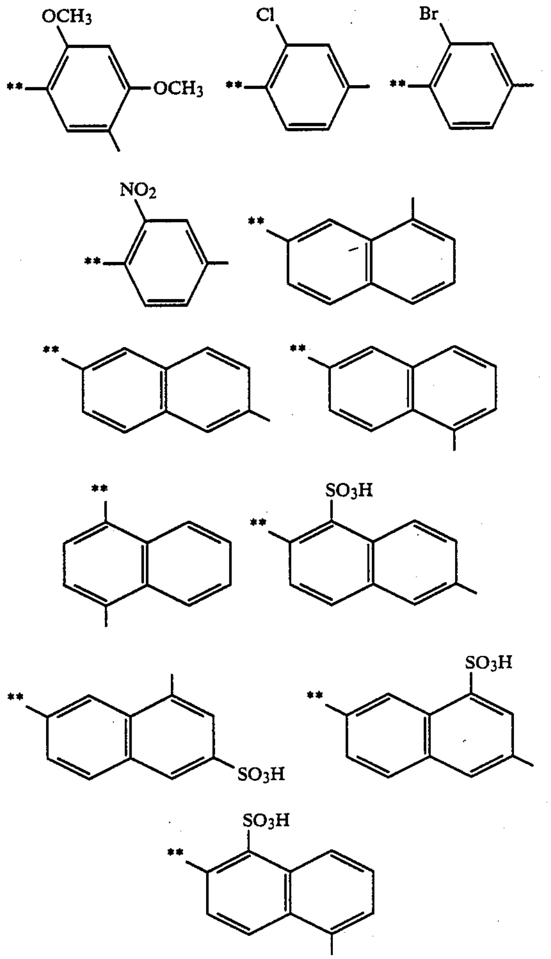

In the above formulas, the linkage marked with ** bonds to $$-\overset{R_6}{\underset{|}{N}}- \quad -\overset{R_{36}}{\underset{|}{N}}-.$$

Of these, particularly preferred are phenylene unsubstituted or substituted by methyl or methoxy and β-naphthylene unsubstituted or substituted by sulfo.

The group which is capable of being split by the action of an alkali, and represented by L when D and D' stand for $—CH_2CH_2L$ is well known in this art, and includes sulfato, thiosulfato, acetoxy, chloro and the like. Preferred one represented by D and D' is β-sulfatoethyl, which may be partially replaced by vinyl.

Among the divalent groups represented by the formulas (1) to (6), preferred examples are those represented by the formula (1) wherein $R_8$, $R_9$ and $R_{10}$ are independently each hydrogen or methyl, k is 0 or 1, and l is 1, those represented by the formula (2) wherein m is 0, 1 or 2, those represented by the formula (3) wherein n is 2, 3 or 4, those represented by the formula (4) wherein $R_{11}$, $R_{12}$, $R_{13}$, $R_{14}$, $R_{15}$ and $R_{16}$ are independently each hydrogen, methyl, methoxy, chloro or carboxy, and p and p' are each 1, those represented by the formula (5) wherein $R_{17}$, $R_{18}$ and $R_{19}$ are independently each hydrogen, methyl, methoxy, chloro or carboxy, Y is —O—, $$-\overset{H}{\underset{|}{N}}- \quad \text{or} \quad -\overset{H}{\underset{|}{N}}CO-,$$

q is 2, 3 or 4, and r is 1, and those represented by the formula (6) wherein $R_{22}$, $R_{23}$, $R_{24}$, $R_{25}$, $R_{26}$ and $R_{27}$ are independently each hydrogen, methyl, methoxy, chloro or carboxy, Y' is —O—, $$-\overset{H}{\underset{|}{N}}- \quad \text{or} \quad -\overset{H}{\underset{|}{N}}CO-,$$

and s and t are each 0 or 1.

With respect to the symbol X, among those represented by the formulas (7) and (8), preferred examples are those represented by the formula (7) wherein both $R_{30}$ and $R_{31}$ are methyl and $R_{32}$ is methyl, ethyl, propyl, butyl, hydroxyethyl, hydroxypropyl, methoxyethyl, ethoxymethyl, benzyl, β-phenylethyl, β-dimethylaminoethyl, γ-diethylaminopropyl, carboxymethyl or carboxyethyl, more preferably $C_1$–$C_4$ alkyl, and those represented by the formula (8) wherein $R_{33}$ is hydrogen, chloro, cyano, hydroxy, vinyl, carbomoyl, β-hydroxyethyl or carboxy, particularly preferably carboxy.

With respect to other preferred examples of those represented by the formulas (9) and (10), the alkyl represented by $R_{34}$ and $R_{35}$ in the formula (9) includes $C_1$–$C_4$ alkyl unsubstituted or substituted once or twice by $C_1$–$C_4$ alkoxy, sulfo, carboxy, hydroxy, chloro, phenyl or sulfato. Preferred examples thereof are methyl, ethyl, n-propyl, iso-propyl, n-butyl, iso-butyl, sec-butyl, β-hydroxyethyl, β-sulfatoethyl, β-sulfoethyl, β-methoxyethyl, β-carboxyethyl and the like.

The phenyl represented by $R_{34}$ and $R_{35}$ includes those unsubstituted or substituted once or twice by $C_1$–$C_4$ alkyl, $C_1$–$C_4$ alkoxy, sulfo, carboxy or chloro. Preferred examples thereof are phenyl, 2-, 3- or 4-sulfophenyl, 2-, 3- or 4-carboxyphenyl, 2-, 3- or 4-chlorophenyl, 3,4- 3,5- or 3,6-disulfophenyl and the like.

The naphthyl represented thereby includes those unsubstituted or substituted once, twice or three times by hydroxy, carboxy, sulfo, $C_1$–$C_4$ alkyl, $C_1$–$C_4$ alkoxy or chloro. Preferred examples thereof are 2-, 3-, 4-, 5-, 6-, 7- or 8-sulfo-1-naphthyl, 1-, 5-, 6-, 7- or 8-sulfo-2-naphthyl, 5,7-, 6,8-, 4,8-, 4,7-, 3,8-, 4,6-, 3,7- or 3,6-disulfo-2-naphthyl, 4,6,8-, 2,4,7- or 3,6,8-trisulfo-1-naphthyl, 1,5,7-, 4,6,8- or 3,6,8-trisulfo-2-naphthyl and the like.

The benzyl represented thereby includes those unsubstituted or substituted once or twice by $C_1$–$C_4$ alkyl, $C_1$–$C_4$ alkoxy, sulfo or chloro. Preferred examples thereof are benzyl, 2-, 3- or 4-sulfobenzyl and the like.

Among examples illustrated for those represented by the formula (9), more preferred examples are those amino having the phenyl or naphthyl described hereinabove as any one of $R_{34}$ and $R_{35}$. Of these, particularly preferred are those having hydrogen, methyl or ethyl as $R_{34}$, and the phenyl or naphthyl described above as $R_{35}$.

Preferred examples of those represented by $R_{36}$, B' and D' for the formula (10) are as described above for $R_6$, B and D.

The anthrapyridone compound of the formula (I) may be in the form of a free acid or preferably an alkali metal or alkaline earth metal salt such as sodium salt and potassium salt.

The compound (I) of the present invention can be readily produced in a conventional manner using cyanuric chloride or fluoride and starting compounds represented by the following formulas (II-1), (II-2) and (III) to (VII);

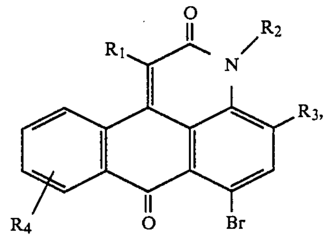

(II-1)

$$HV-A-\underset{\underset{R_5}{|}}{N}-W, \qquad \text{(II-2)}$$

$$\overset{R_6}{\overset{|}{HN}}-B-SO_2-D, \qquad \text{(III)}$$

$$N(R_{30})(R_{31})R_{32}, \qquad \text{(IV)}$$

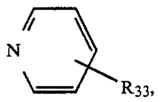

(V)

$$HN(R_{35})-R_{34}, \qquad \text{(VI)}$$

$$\overset{R_{36}}{\overset{|}{HN}}-B'-SO_2-D' \qquad \text{(VII)}$$

wherein A, $R_1$, $R_2$, $R_3$, $R_4$, $R_5$, $R_6$, $R_{30}$, $R_{31}$, $R_{32}$, $R_{33}$, $R_{34}$, $R_{35}$, $R_{36}$, B, B', D, D' and W are as defined above.

That is, both compounds represented by the formulas (II-1) and (II-2) can be subjected to Ullmann's condensation reaction, followed by hydrolysis in the presence of an alkali or an acid when the compound of the formula (II-2) wherein W is the amino protecting group such as acetyl is used, thereby obtaining a chromophore compound represented by the formula (II).

Successively, the compounds of the formulas (II) and (III) and cyanuric chloride or fluoride can be subjected to first and second condensation reactions in an optional order, if necessary, followed by condensation reaction with any one of the compounds of the formulas (IV) to (VII), whereby the desired anthrapyridone compound of the formula (I) can be produced.

Examples of the starting compounds represented by the formula (II-1) are N-methyl-4-bromo-1,9-anthrapyridone, N-methyl-4-bromo-1,9-anthrapyridone-2-sulfonic acid, N-ethyl-4-bromo-1,9-anthrapyridone, N-ethyl-4-bromo-1,9-anthrapyridone-2-sulfonic acid, C-benzoyl-N-methyl-4-bromo-1,9-anthrapyridone, C-ethoxycarbonyl-N-methyl-4-bromo-1,9-anthrapyridone, C-acetyl-N-methyl-1,9-anthrapyridone and the like.

Examples of the starting compounds represented by the formula (II-2) are aromatic amines such as 2,4,6-trimethyl-3,5-diaminobenzenesulfonic acid, 5-methyl-2,4-diaminobenzenesulfonic acid, 2,4-diaminobenzene-1,5-disulfonic acid, 2,5-diaminobenzene-1,4-disulfonic acid, 2,5-diamino-4-methoxybenzenesulfonic acid, 4-aminomethyl-2-amino-5-methylbenzenesulfonic acid, 4- or 5-aminomethyl-2-aminobenzenesulfonic acid, 5-aminomethyl-3-amino-2,4-dimethylbenzenesulfonic acid, 6-aminomethyl-2-amino-3-methoxybenzenesulfonic acid, 3-aminomethyl-2-amino-5-methylbenzenesulfonic acid, 4-aminomethyl-2-amino-5-methoxybenzenesulfonic acid, 5-aminomethyl-2-aminobenzene-1,4-disulfonic acid, 4-aminomethyl-2-amino-5-ethylbenzenesulfonic acid, their aminomethyl-carrying analogues wherein the amino is N-methylated or N-ethylated, ethylenediamine, 1,3-diaminopropane, 1,4-diaminobutane, 1,6-diaminohexane, 4,4'-diaminobiphenyl-2,2'-disulfonic acid, 4,4'-diaminobiphenyl-3-sulfonic acid, m- or p-phenylenediamine, 2,4- or 2,5-diaminobenzenesulfonic acid, N-β-carboxyethyl-p-phenylenediamine, 4-(β-aminoethylamino)aniline, 4-(γ-aminopropylamino)aniline, 4-(β-aminoethylamino)aniline-2-sulfonic acid, 4-(β-aminoethylamino)aniline-3-sulfonic acid, 4-(β-aminoethylamino)aniline-2,5-disulfonic acid, 4-(γ-aminopropylamino)aniline-2-sulfonic acid, 4-(γ-aminopropylamino)aniline-2,5-disulfonic acid, 4-(4'-aminobutylamino)aniline-3-sulfonic acid, 4-(5'-aminoamylamino)aniline-3-sulfonic acid, 4-(6'-aminohexylamino)aniline-3-sulfonic acid, 4-(3'-aminophenylamino)aniline, 4-(4'-aminophenylamino)aniline, 4-(3'-aminophenylamino)aniline-2-sulfonic acid, 4-(3'-aminophenylamino)aniline-3-sulfonic acid, 4-(4'-aminophenylamino)aniline-2-sulfonic acid, 4-(4'-aminophenylamino)aniline-3-sulfonic acid, 4-[(3'-amino-4'-sulfo)phenylamino]aniline, 4-[(4'-amino-3'-sulfo)-phenylamino]aniline, 4-[(3'-amino-4'-sulfo)-phenylamino]aniline-2-sulfonic acid, 4-[(3'-amino-4'-sulfo)phenylamino]aniline-3-sulfonic acid, 4-[(4'-amino-3'-sulfo)phenylamino]aniline-2-sulfonic acid, 4-[(4'-amino-3'-sulfo)phenylamino]aniline-3-sulfonic acid, 4-[(4'-amino-2',5'-disulfo)phenylamino]aniline-3-sulfonic acid, their analogues wherein one of the amino groups is protected by acetyl or the like, and the like.

Examples of the starting compounds represented by the formula (VI) are aromatic amines such as aminobenzene, 1-amino-2-, 3- or 4-methylbenzene, 1-amino-2-, 3- or 4-ethylbenzene, 1-amino-2-, 3- or 4-methoxybenzene, 1-amino-2-, 3- or 4-ethoxybenzene, 1-amino-2-, 3- or 4-chlorobenzene, 1-amino-2,4- or 2,5-dimethylbenzene, 1-amino-3,4- or 3,5-dimethylbenzene, 1-amino-2,4- or 2,5-dichlorobenzene, their N-methyl or N-ethyl analogues, 2-, 3- or 4-aminobenzenesulfonic acid, 5-aminobenzene-1,3-disulfonic acid, 6-aminobenzene-1,4-disulfonic acid, 4-aminobenzene-1,2-disulfonic acid, 4-amino-5-methylbenzene-1,2-disulfonic acid, 3- or 4-aminobenzoic acid, 5-aminobenzene-1,3-dicarboxylic acid, 5-amino-2-hydroxybenzenesulfonic acid, 4-amino-2-hydroxybenzenesulfonic acid, 5-amino-2-ethoxybenzenesulfonic acid, N-(2-hydroxyethyl)-amino-3-methylbenzene, 3- or 4-methylaminobenzoic acid, 3- or 4-methylaminobenzenesulfonic acid, 2-aminonaphthalene-1-sulfonic acid, 4-aminonaphthalene-1-sulfonic acid, 5-aminonaphthalene-1-sulfonic acid, 6-aminonaphthalene-1-sulfonic acid, 7-aminonaphthalene-1-sulfonic acid, 8-aminonaphthalene-1-sulfonic acid, 1-aminonaphthalene-2-sulfonic acid, 4-aminonaphthalene-2-sulfonic acid, 5-aminonaphthalene-2-sulfonic acid, 6-aminonaphthalene-2-sulfonic acid, 7-aminonaphthalene-2-sulfonic acid, 7-methylaminonaphthalene-2-sulfonic acid, 7-ethylaminonaphthalene-2-sulfonic acid, 7-butylaminonaphthalene-2-sulfonic acid, 7-isobutylaminonaphthalene-2-sulfonic acid, 8-aminonaphthalene-2-sulfonic acid, 4-aminonaphthalene-1,3-disulfonic acid, 5-aminonaphthalene-1,3-disulfonic acid, 6-aminonaphthalene-1,3-disulfonic acid, 7-aminonaphthalene-1,3-disulfonic acid, 8-aminonaphthalene-1,3-disulfonic acid, 2-aminonaphthalene-1,5-disulfonic acid, 3-aminonaphthalene-1,5-disulfonic acid, 4-aminonaphthalene-1,5-disulfonic acid, 4-aminonaphthalene-1,6-disulfonic acid, 8-aminonaphthalene-1,6-disulfonic acid, 4-aminonaphthalene-1,7-disulfonic acid, 3-aminonaphthalene-2,6-disulfonic acid, 4-aminonaphthalene-2,6-disulfonic acid, 3-aminonaphthalene-2,7-disulfonic acid, 4-aminonaphthalene-2,7-disulfonic acid, 6-aminonaphthalene-1,3,5-trisulfonic acid, 7-aminonaphthalene-1,3,5-trisulfonic acid, 4-aminonaphthalene-1,3,6-trisulfonic acid, 7-aminonaphthalene-1,3,6-trisulfonic acid, 8-aminonaphthalene-1,3,6-trisulfonic acid, 4-aminonaphthalene-1,3,7-trisulfonic acid and the like, and aliphatic amines such as methylamine, ethylamine, n-propylamine, isopropylamine, n-butylamine, isobutylamine, sec-butylamine, dimethylamine, diethylamine, methylethylamine, allylamine, 2-chloroethylamine, 2-methoxyethylamine, 2-aminoethanol, 2-methylaminoethanol, bis-(2-hydroxyethyl)amine, 2-acetylaminoethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamine, aminoacetic acid, methylaminoacetic acid, ξ-aminocaproic acid, 1,3- or 1,4-diaminocyclohexane, 2- or 4-methyl-1,3-diaminocyclohexane, 5,5-dimethyl-1,3-diaminocyclohexane, 1-amino-4-N-methyl, N-ethyl or N-β-carboxyethylaminocyclohexane, benzylamine, 2-, 3- or 4-chlorobenzylamine, 4-methylbenzylamine, N-methylbenzylamine, 2-, 3- or 4-sulfobenzylamine, 2-phenylethylamine, 1-phenylethylamine, 1-phenyl-2-propylamine, and the like.

After completion of the reaction, the desired anthrapyridone compound-containing reaction mixture may be formed to a liquid commercial product, if desired, after removing inorganic salts and with addition of a stabilizer or a dyeing improver. The liquid product obtained or the aforesaid reaction mixture may be subjected to evaporation such as spray-drying, thereby obtaining a pulverulent commercial product. Alternatively according to a conventional manner, the reaction mixture may be formed into either liquid or pulverulent commerical product through salting-out using an electrolyte.

The anthrapyridone compound (I) of the present invention is fiber-reactive and useful for dyeing or printing hydroxyl group-containing and amide group-containing materials, preferably in a fibrous form.

The hydroxyl group-containing materials include natural or synthetic hydroxyl group-containing materials such as cellulose fiber materials, regenerated products thereof and polyvinyl alcohol. Examples of the cellulose fiber materials are cotton and other vegetable fiber such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing can be carried out in a manner suitable for the reactivity of the fiber reactive dye.

For example, cellulose fiber materials can be dyed using the anthrapyridone compound of the present invention together with an acid binding agent such as sodium hydroxide, sodium carbonate, phosphates, silicates and sodium hydrogencarbonate in a manner which can be selected from those depending on the property of fibers and physical shape thereof. Examples of the manner applicable are exhaustion dyeing, printing, cold pad batch-up and the other methods.

The exhaustion dyeing can be carried out at a relatively low temperature in the presence of an acid binding agent such as sodium carbonate, trisodium phosphate, sodium hydroxide and the like as well as a neutral salt such as sodium sulfate, sodium chloride and the like.

The printing can be carried out by printing the fiber materials with a printing paste containing a paste or emulsified paste such as sodium alginate, starch ether and the like, and an alkali agent such as sodium carbonate, sodium hydrogencarbonate, trisodium phosphate, sodium trichloroacetate and other alkaline or alkali-liberating agents such as potassium or alkaline earth metal salts corresponding to the above, if desired together with a conventional printing auxiliary agent such as urea or a dispersing agent, followed by drying and heat-treating particularly in the presence of steam.

The cold pad batch-up dyeing can be carried out by padding the fiber materials with a padding liquor at ambient temperature, batching up and allowing them to stand on a roller for 3 hours or more or over-night, followed by washing with water and drying. The padding liquor can be prepared in a conventional manner using an acid binding agent such as sodium hydroxide alone or a mixture of sodium hydroxide with sodium silicate, sodium sulfate or sodium chloride optionally together with a dissolution auxiliary agent such as urea and a penetrant.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as condensation product between cyanuric chloride and 3 times by mole of aminobenzenesulfonic acid or aminoaphthalenesulfonic acid, or an addition product between stearylamine and ethylene oxide, and the like.

The present anthrapyridone compound can be characterized by superior dye performance in the dyeing and printing of fiber materials, particularly cellulose fiber materials. For example, the present anthrapyridone compound can exhibit high exhaustion and fixation percentages and superior build-up property as well as superior level-dyeing and washing-off properties and high robustness so that a shade to be obtained can hardly be affected by some changes in dyebath conditions such as dyeing temperatures, bath ratios, salt concentrations and the like.

Moreover, the dyed or printed products are excellent in fastness properties such as light fastness, perspiration-light fastness, perspiration fastness, acid-hydrolysis fastness, washing fastness, chlorine fastness and the like.

The present invention is illustrated in more detail with reference to the following Examples, in which all parts are by weight.

EXAMPLE 1

4-(3'-Amino-2',4',6'-trimethyl-5'-sulfoanilino)-N-methylanthrapyridone (24.5 parts), cyanuric chloride (9.3 parts) and 1-aminobenzene-3-β-sulfatoethylsulfone (14.1 parts) were subjected to condensation reactions one after another in an aqueous medium. The first condensation reaction was carried out at 10° to 20° C., and the second at 40° to 50° C. Thereafter, salting out of the reaction mixture gave an anthrapyridone compound represented by the following formula (free acid form).

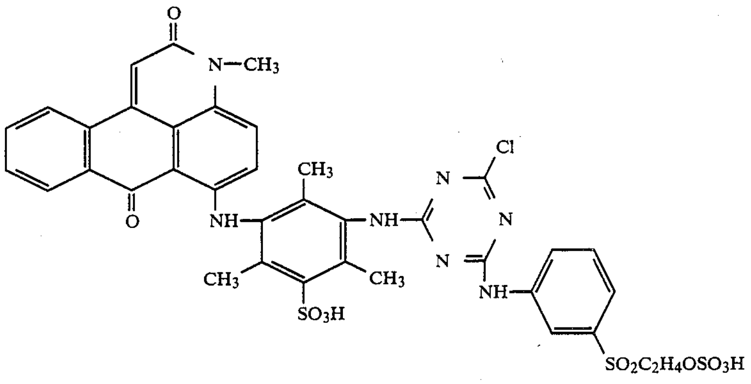

λmax 520 nm

Using the anthrapyridone compound, fiber materials, particularly cellulose fiber materials such as cotton can be dyed by the dyeing methods described hereinabove, for example, exhaustion dyeing method to obtain a dyed product in a red color excellent in light fastness, perspiration-light fastness, perspiration fastness and others with high exhaustion and fixation percentages and superior build-up property.

EXAMPLE 2

Example 1 was repeated, provided that the compounds shown in 1st and 2nd columns of the following table were used in place of the 4-(3'-amino-2',4',6'-trimethyl-5'-sulfoanilino)-N-methylanthrapyridone and 1-aminobenzene-3-β-sulfatoethylsulfone, respectively, thereby obtaining a corresponding anthrapyridone compound. A color shade obtained by dyeing cotton using the compound was as shown in a 3rd column of the Table.

TABLE
| Run No. | 1st | 2nd | 3rd |
|---|---|---|---|
| 1 | 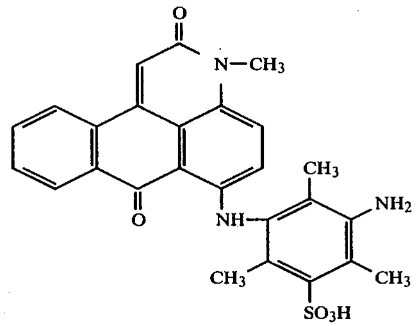 | 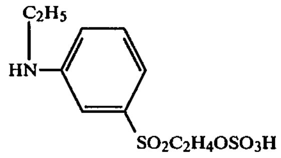 | Red |
| 2 | " | 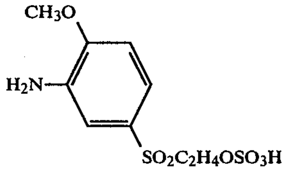 | " |
| 3 | " | 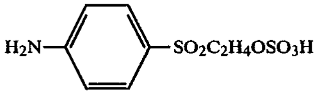 | " |
| 4 | " | 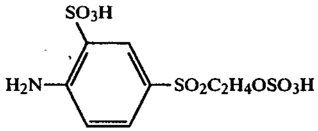 | " |
| 5 | " | 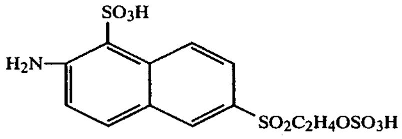 | " |

TABLE-continued
| Run No. | 1st | 2nd | 3rd |
|---|---|---|---|
| 6 | 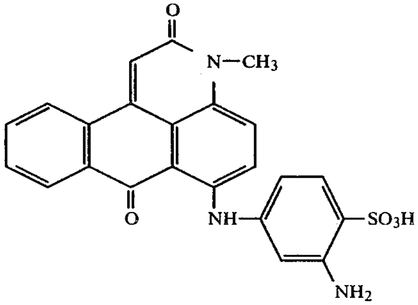 | 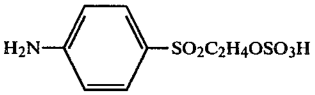 | " |
| 7 | " | 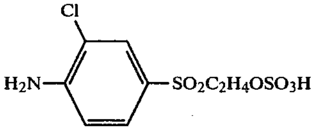 | " |
| 8 | " | 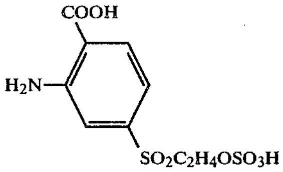 | " |
| 9 | 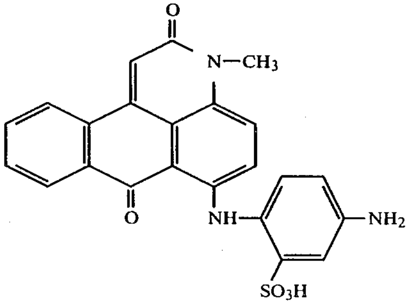 | 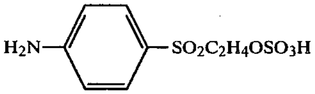 | " |

TABLE-continued
| Run No. | 1st | 2nd | 3rd |
|---|---|---|---|
| 10 | 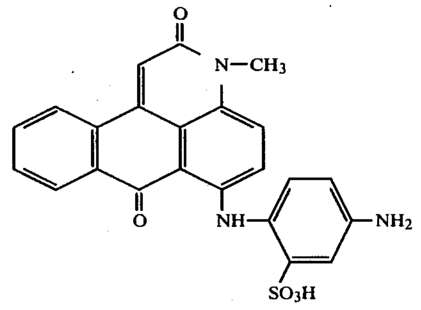 | 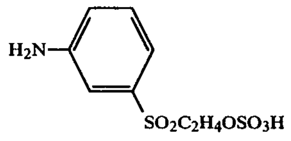 | Red |
| 11 | 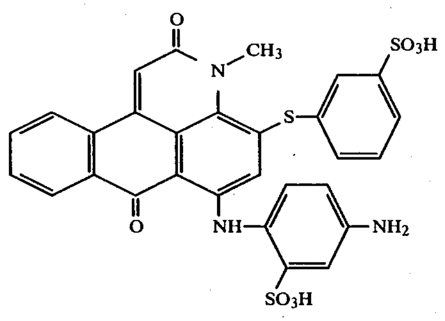 | 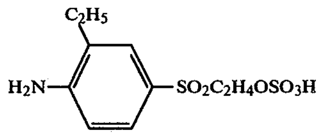 | " |
| 12 | 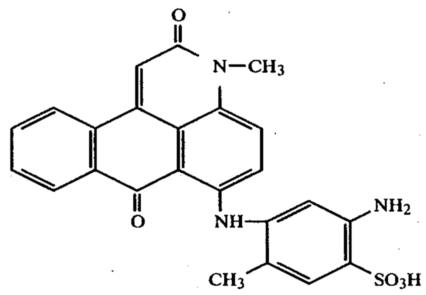 | 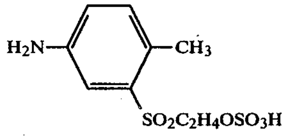 | " |

TABLE-continued
| Run No. | 1st | 2nd | 3rd |
|---|---|---|---|
| 13 | 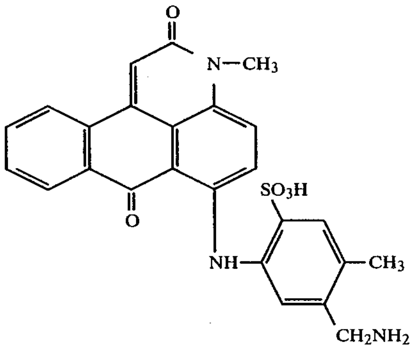 | 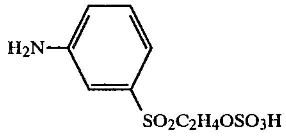 | " |
| 14 | 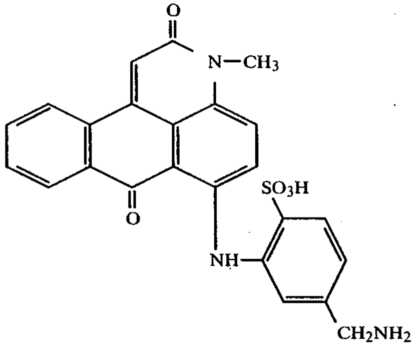 | 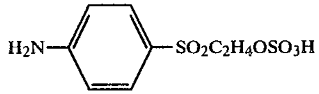 | " |
| 15 | 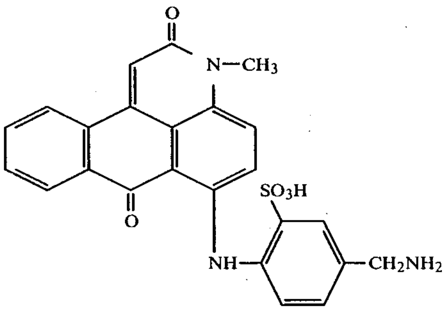 | 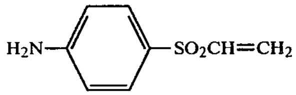 | Red |

TABLE-continued
| Run No. | 1st | 2nd | 3rd |
| --- | --- | --- | --- |
| 16 | 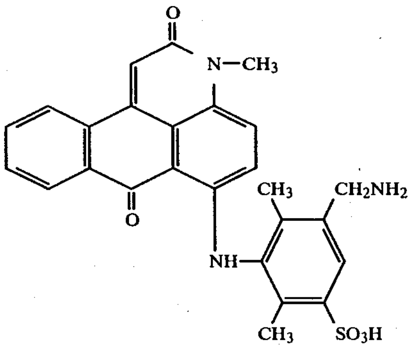 | 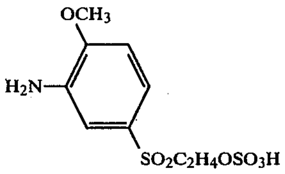 | " |
| 17 | 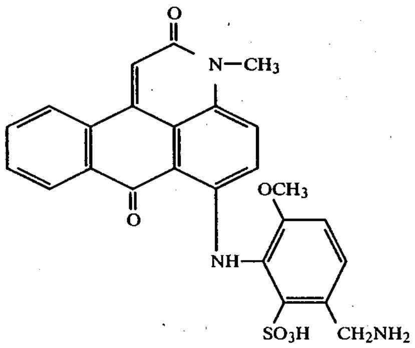 |  | " |

TABLE-continued
| Run No. | 1st | 2nd | 3rd |
|---|---|---|---|
| 18 | 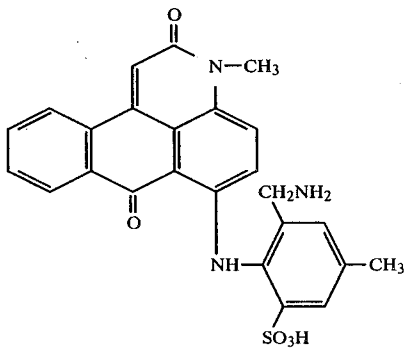 | 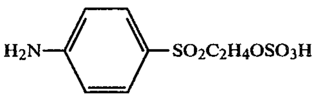 | " |
| 19 | 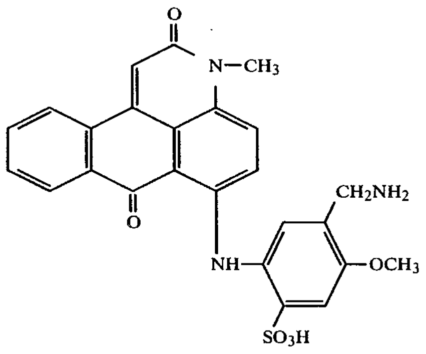 | 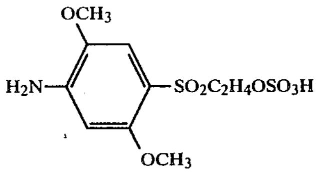 | " |
| 20 | 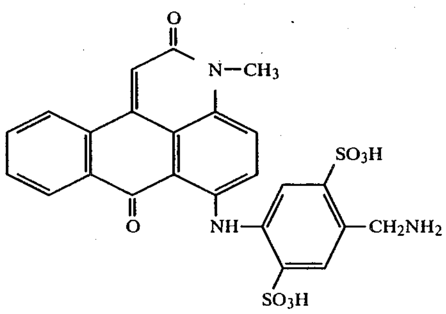 | 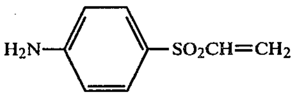 | Red |

TABLE-continued
| Run No. | 1st | 2nd | 3rd |
|---|---|---|---|
| 21 | 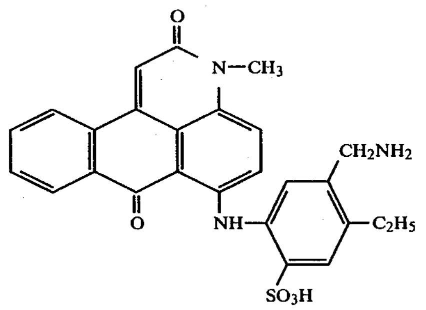 | 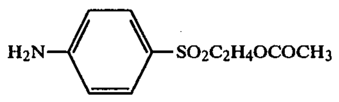 | " |
| 22 | 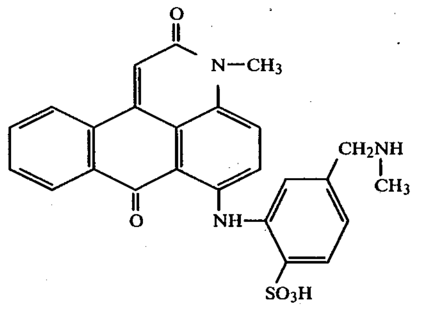 | 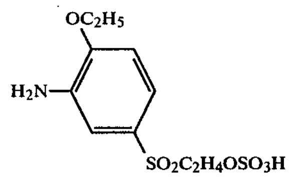 | " |
| 23 | 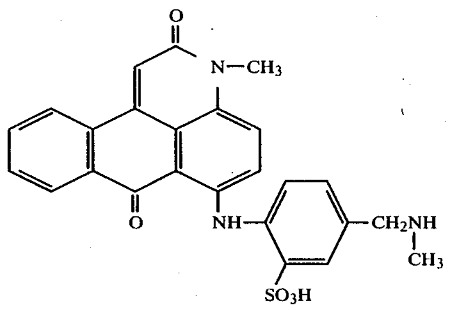 | " | " |

TABLE-continued
| Run No. | 1st | 2nd | 3rd |
|---|---|---|---|
| 24 | 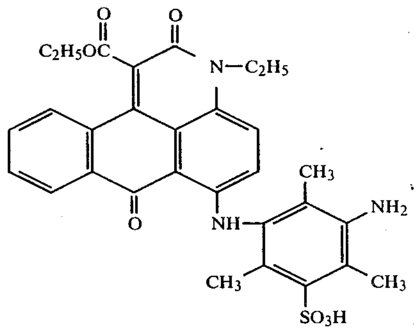 | 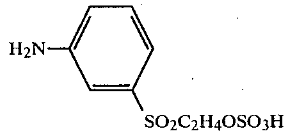 | " |
| 25 | 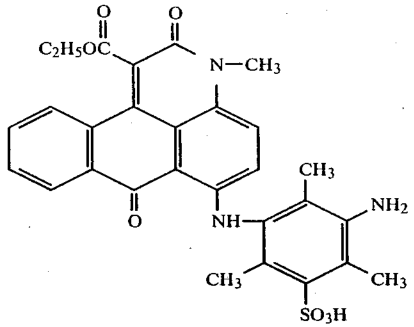 | 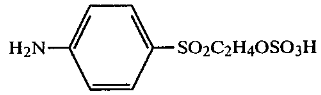 | Red |
| 26 | " | 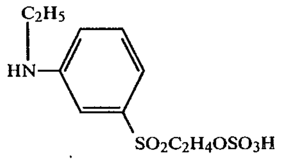 | " |
| 27 | " |  | " |

TABLE-continued
| Run No. | 1st | 2nd | 3rd |
|---|---|---|---|
| 28 | " | 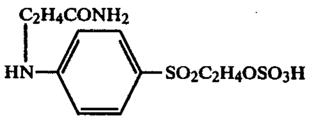 | " |
| 29 | 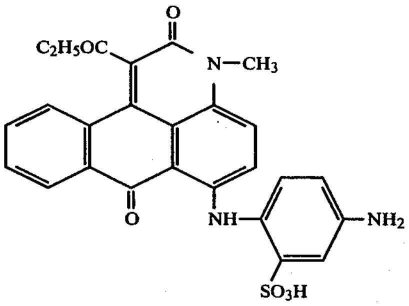 | 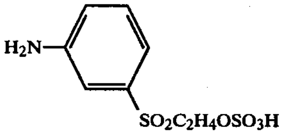 | " |
| 30 | " | 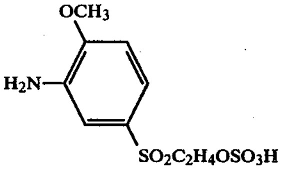 | " |
| 31 | 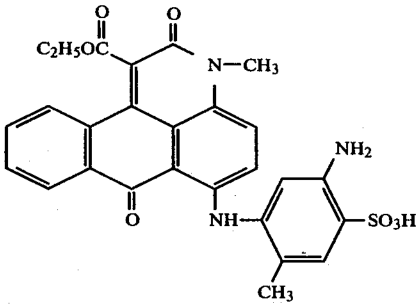 | 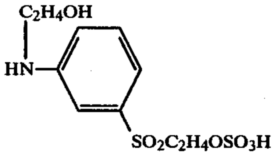 | " |

TABLE-continued
| Run No. | 1st | 2nd | 3rd |
|---|---|---|---|
| 32 | " | 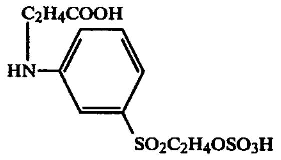 | " |
| 33 | 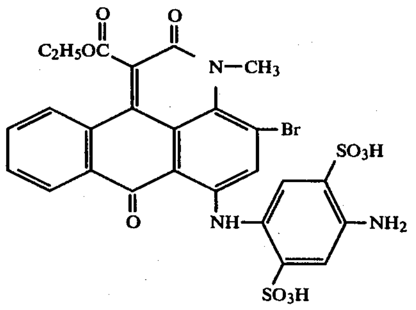 | 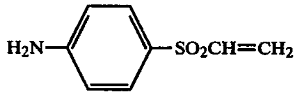 | " |
| 34 | 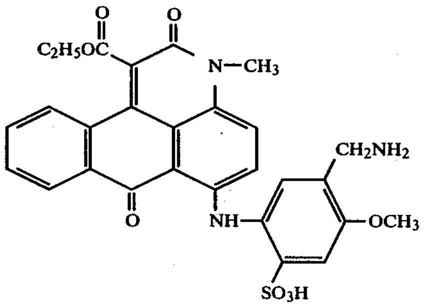 |  | " |

TABLE-continued
| Run No. | 1st | 2nd | 3rd |
|---|---|---|---|
| 35 | 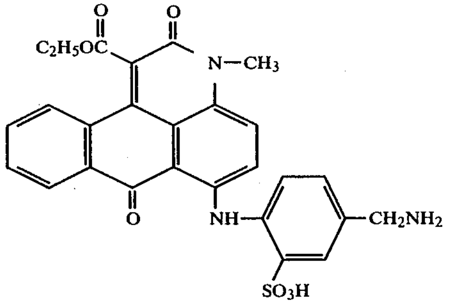 | 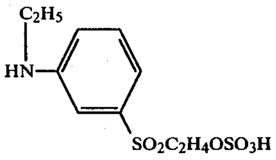 | " |
| 36 | 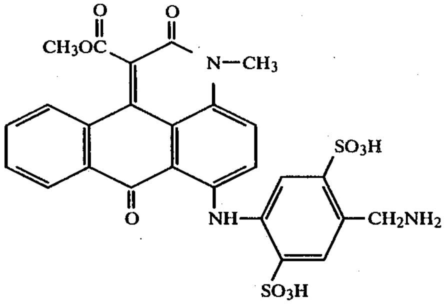 | 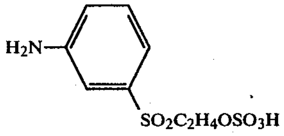 | Red |
| 37 | 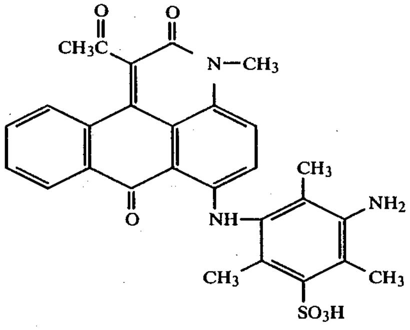 | 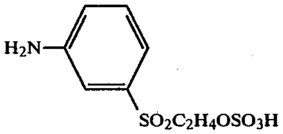 | " |

TABLE-continued
| Run No. | 1st | 2nd | 3rd |
|---|---|---|---|
| 38 | " | 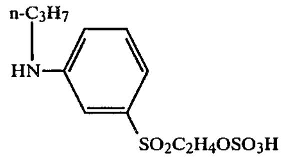 | " |
| 39 | " | 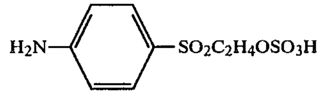 | " |
| 40 | 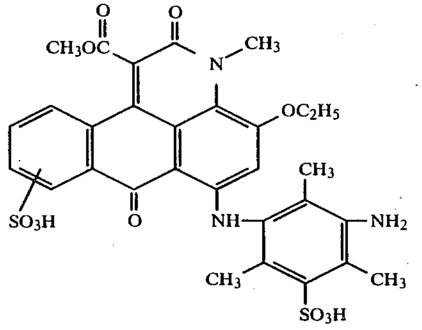 | 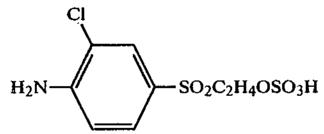 | " |
| 41 | 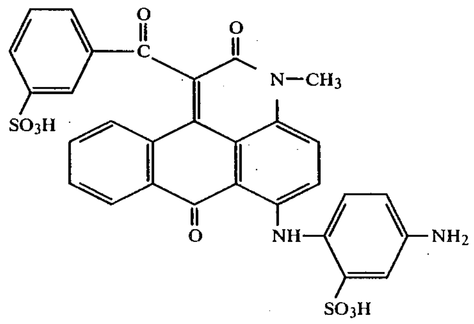 | 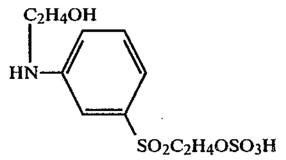 | Red |

TABLE-continued
| Run No. | 1st | 2nd | 3rd |
|---|---|---|---|
| 42 | " | 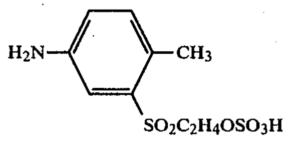 | " |
| 43 | 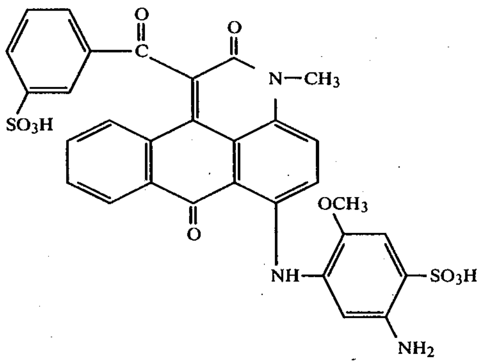 | 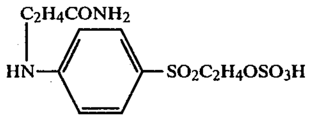 | " |
| 44 | 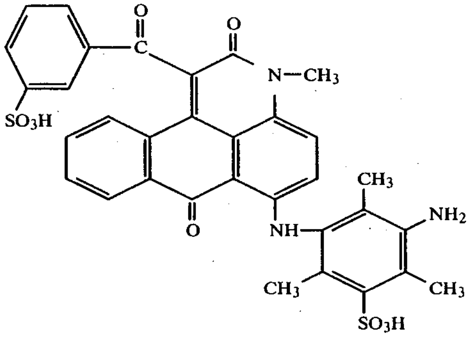 | 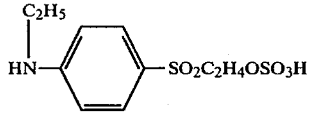 | " |

TABLE-continued
| Run No. | 1st | 2nd | 3rd |
| --- | --- | --- | --- |
| 45 | 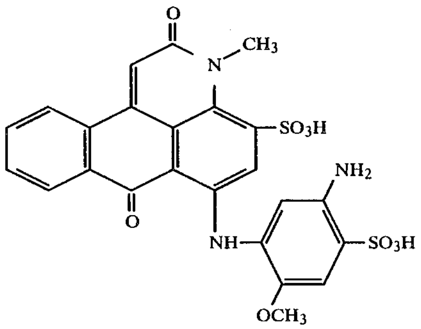 | 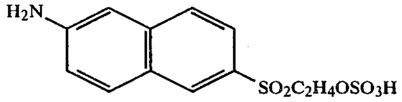 | |
| 46 | 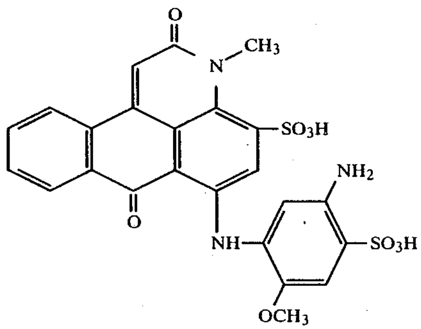 | 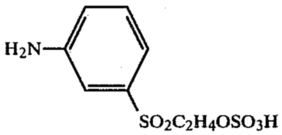 | Red |
| 47 | " | 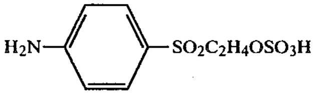 | " |

TABLE-continued
| Run No. | 1st | 2nd | 3rd |
|---|---|---|---|
| 48 | 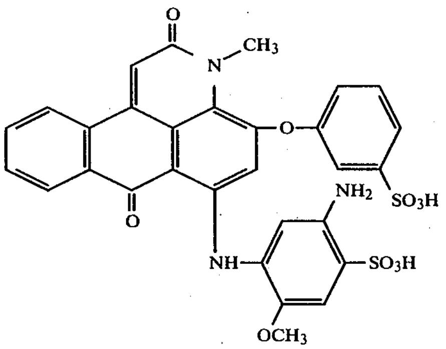 | 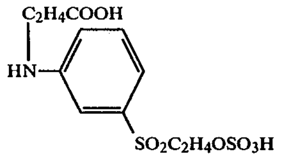 | " |
| 49 | 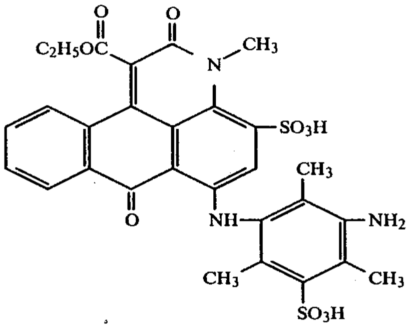 | 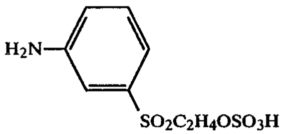 | " |
| 50 | " | 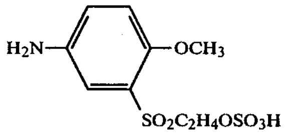 | " |

TABLE-continued
| Run No. | 1st | 2nd | 3rd |
|---|---|---|---|
| 51 | 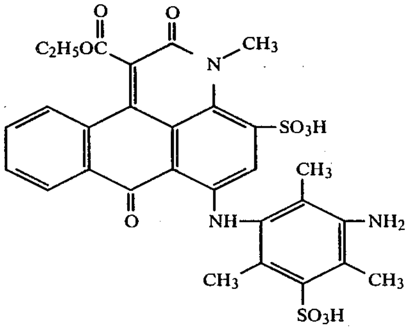 | 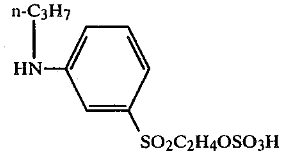 | Red |
| 52 | 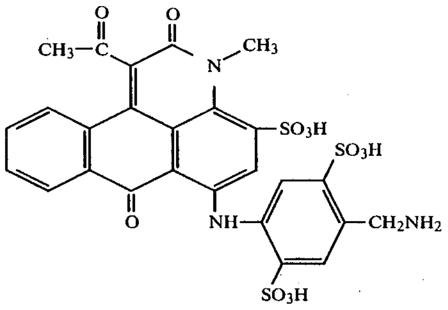 | 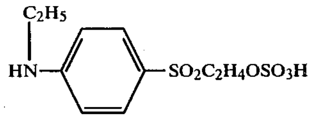 | " |
| 53 | 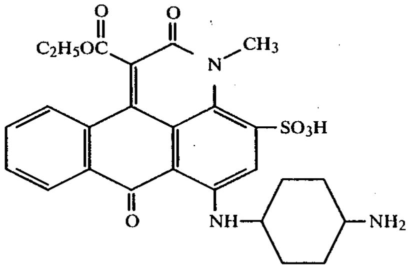 | 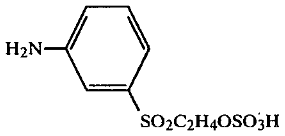 | " |

TABLE-continued
| Run No. | 1st | 2nd | 3rd |
|---|---|---|---|
| 54 | 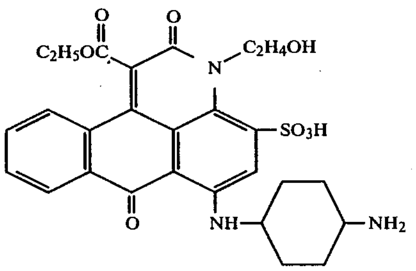 | 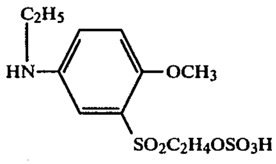 | " |
| 55 | 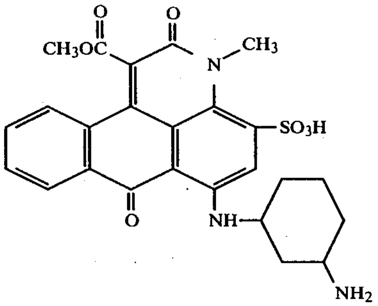 | 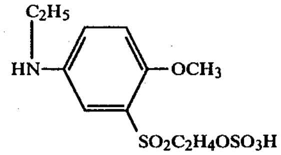 | " |
| 56 | 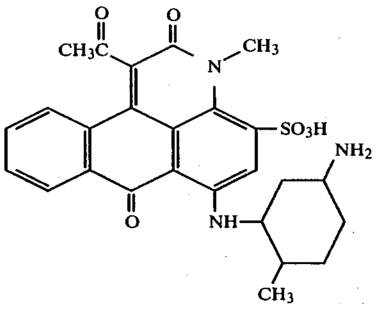 | 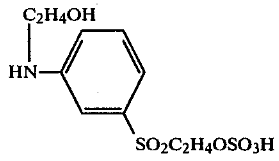 | Red |

TABLE-continued
| Run No. | 1st | 2nd | 3rd |
| --- | --- | --- | --- |
| 57 | 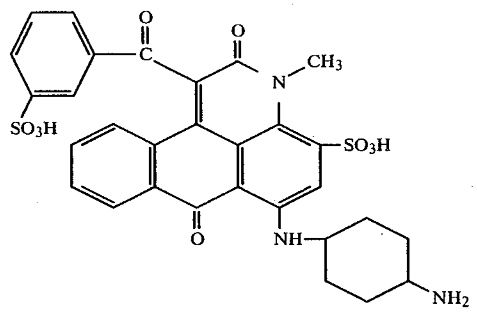 | 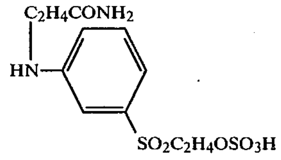 | " |
| 58 | 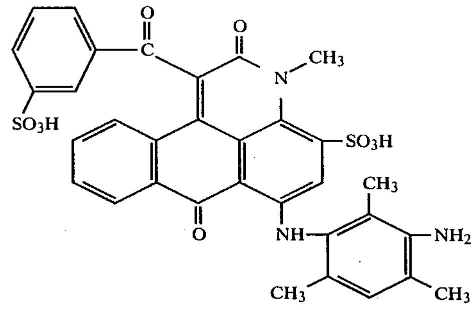 | 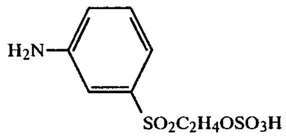 | " |
| 59 | 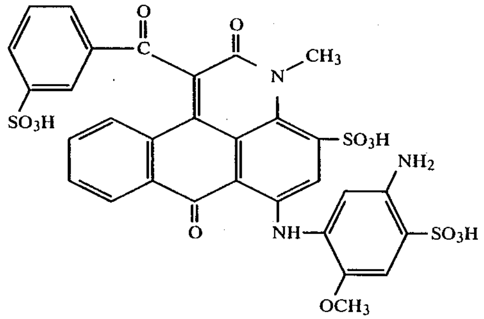 | " | " |

TABLE-continued
| Run No. | 1st | 2nd | 3rd |
|---|---|---|---|
| 60 | " | 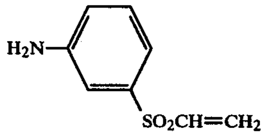 | " |
| 61 | 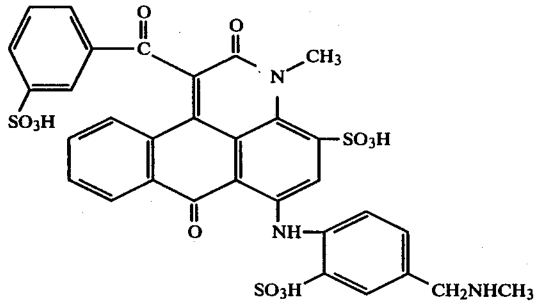 | 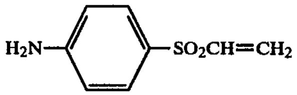 | Red |
| 62 | 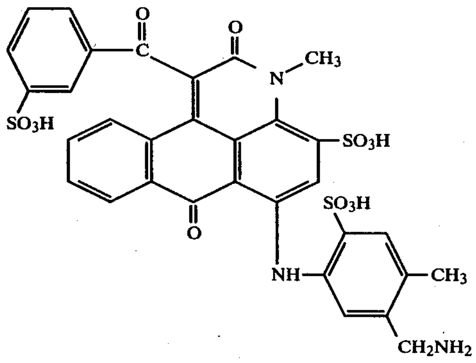 | 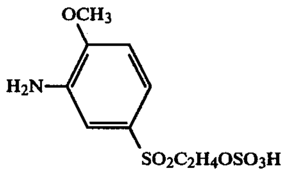 | " |

TABLE-continued
| Run No. | 1st | 2nd | 3rd |
|---|---|---|---|
| 63 | 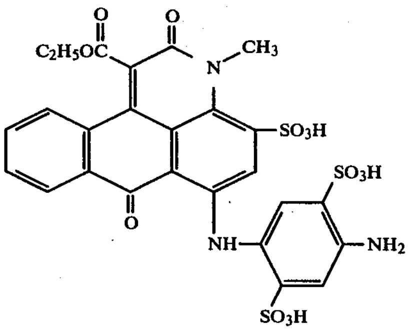 | " | " |
| 64 | " | 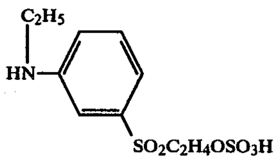 | " |
| 65 | 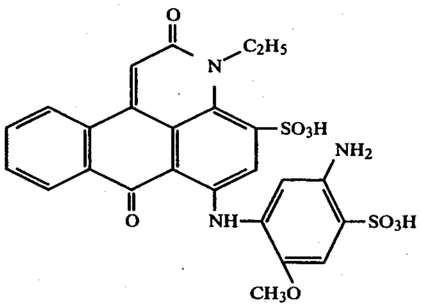 | 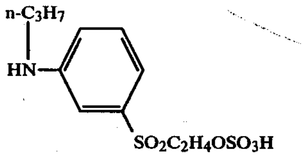 | Red |

TABLE-continued
| Run No. | 1st | 2nd | 3rd |
|---|---|---|---|
| 66 | 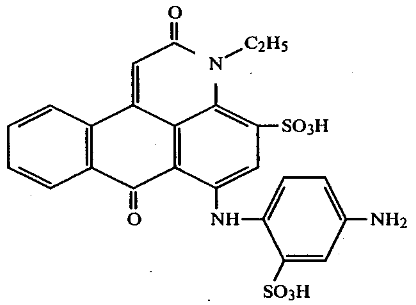 | 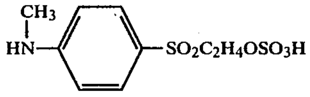 | " |
| 67 | 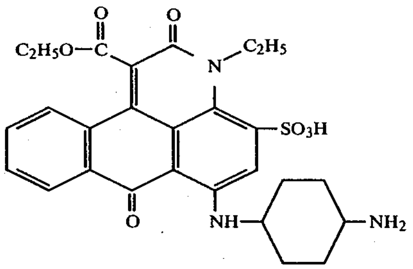 | 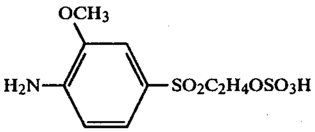 | " |
| 68 | 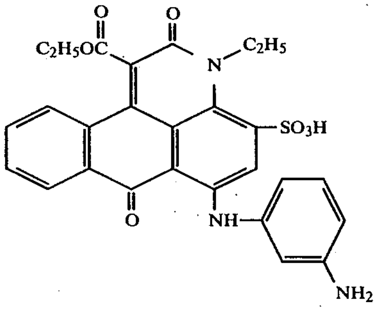 | 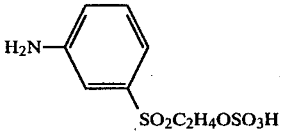 | " |

TABLE-continued
| Run No. | 1st | 2nd | 3rd |
|---|---|---|---|
| 69 | 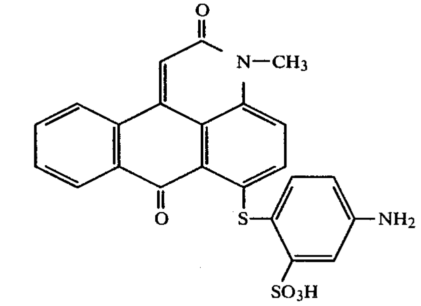 | 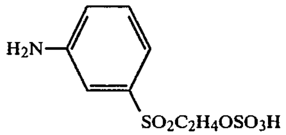 | Reddish yellow |
| 70 | 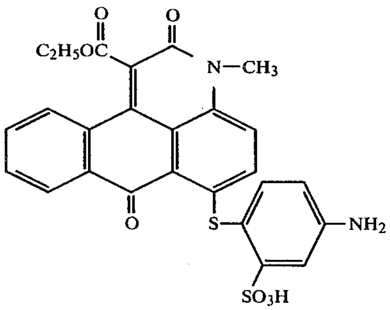 | 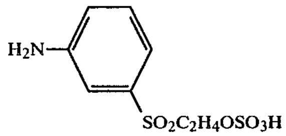 | Reddish Yellow |
| 71 | 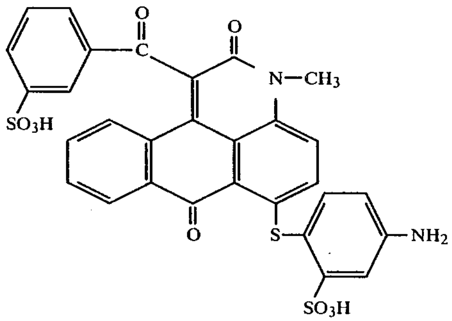 | 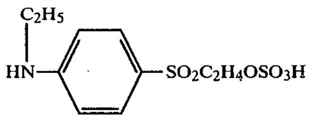 | " |

TABLE-continued
| Run No. | 1st | 2nd | 3rd |
|---|---|---|---|
| 72 | 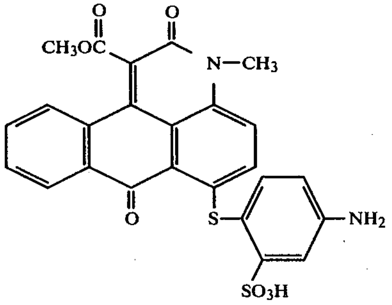 | 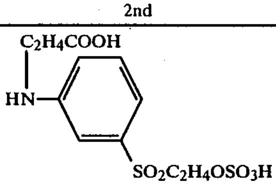 | " |
| 73 | 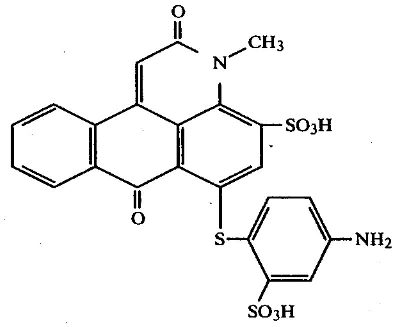 | 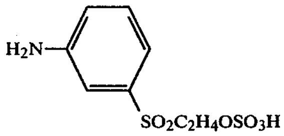 | Yellow |

TABLE
| Run No. | 1st | 2nd | 3rd |
|---|---|---|---|
| 74 | 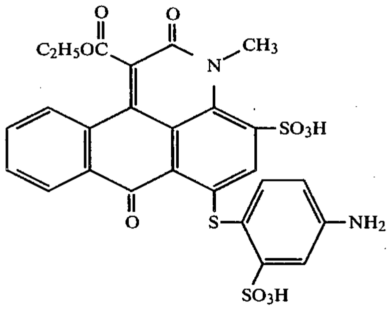 |  | Reddish Yellow |
| 75 | 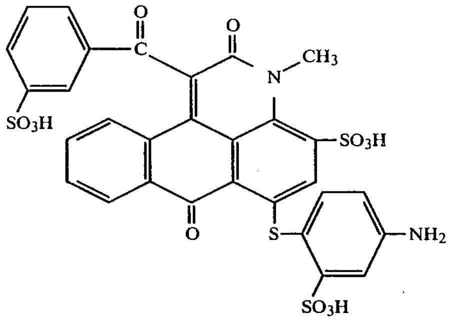 | 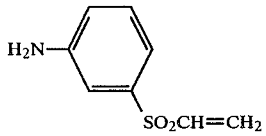 | " |
| 76 | " | 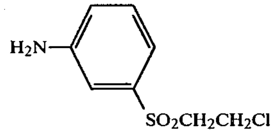 | " |
| 77 | 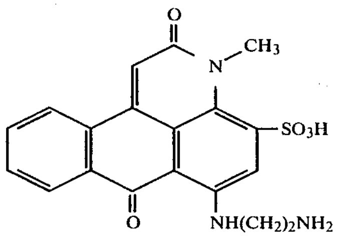 | 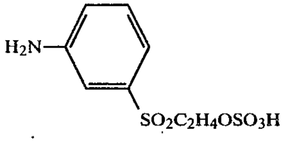 | Red |

TABLE-continued
| Run No. | 1st | 2nd | 3rd |
|---|---|---|---|
| 78 | 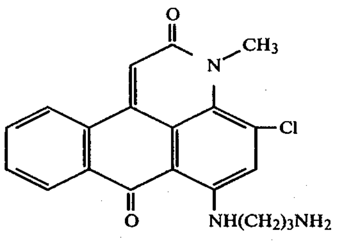 | " | " |
| 79 | 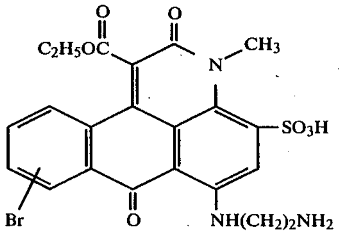 | 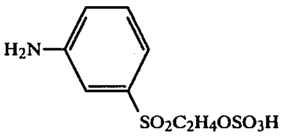 | Red |
| 80 | 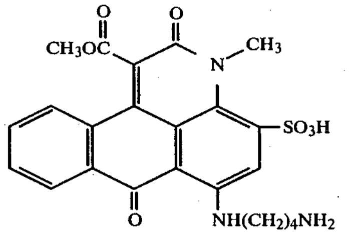 | " | " |
| 81 | 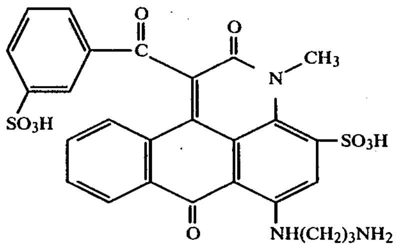 | 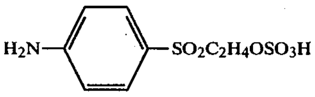 | " |

TABLE-continued
| Run No. | 1st | 2nd | 3rd |
|---|---|---|---|
| 82 | 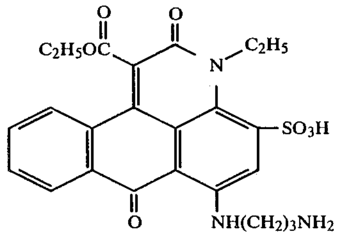 | 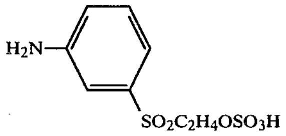 | " |
| 83 | 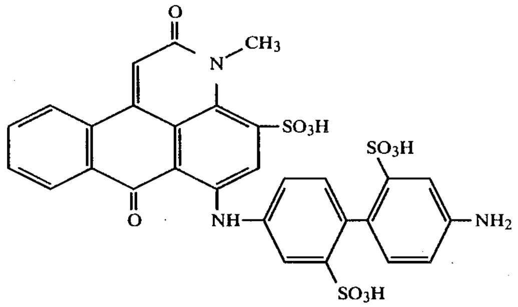 | 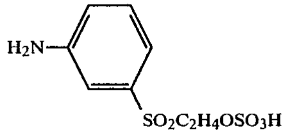 | " |
| 84 | 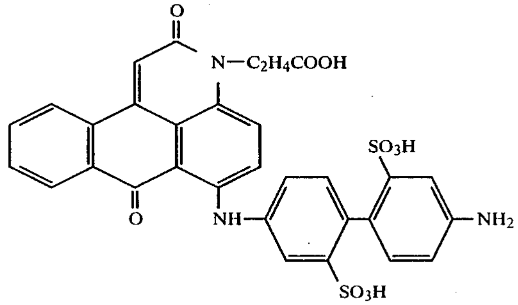 | 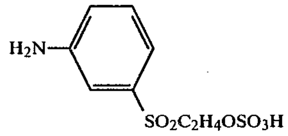 | Red |

TABLE-continued
| Run No. | 1st | 2nd | 3rd |
|---|---|---|---|
| 85 | 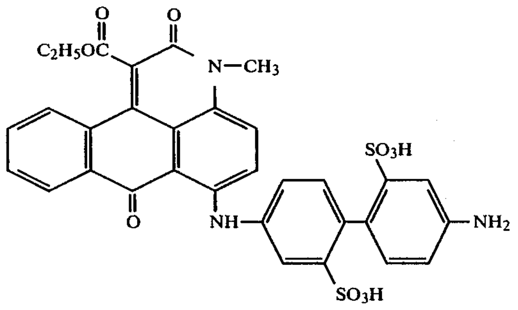 | " | " |
| 86 | " | 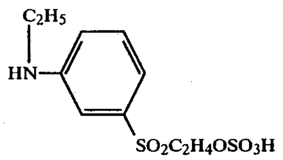 | " |
| 87 | 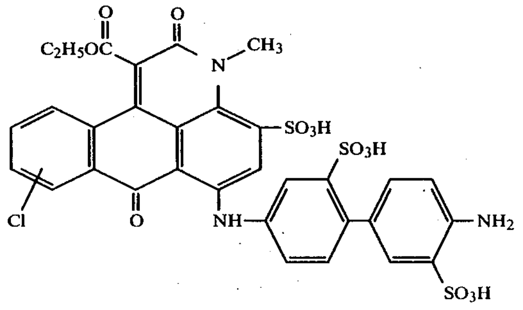 | " | " |

TABLE-continued
| Run No. | 1st | 2nd | 3rd |
| --- | --- | --- | --- |
| 88 | 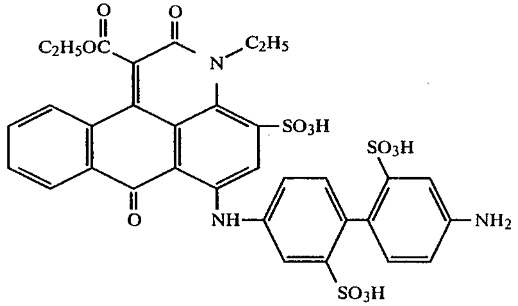 | 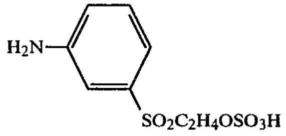 | " |
| 89 | 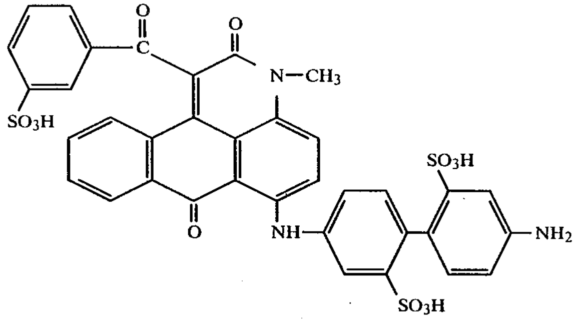 | 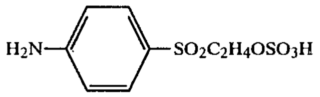 | Red |
| 90 | 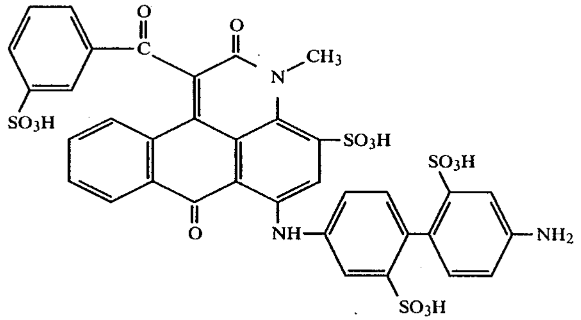 | 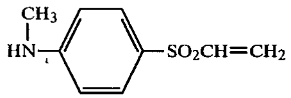 | " |

TABLE-continued
| Run No. | 1st | 2nd | 3rd |
|---|---|---|---|
| 91 | " | 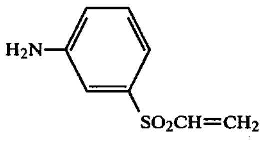 | " |
| 92 | " | 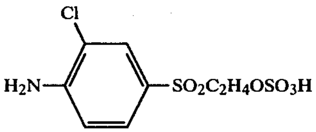 | " |
| 93 | 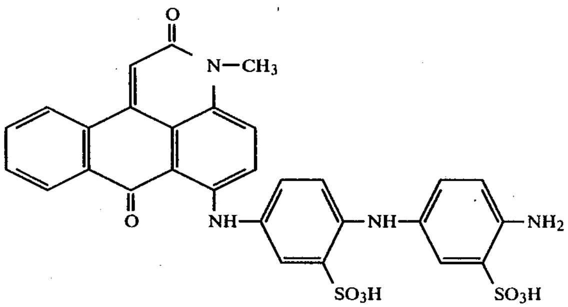 | 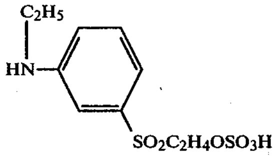 | " |
| 94 | " | 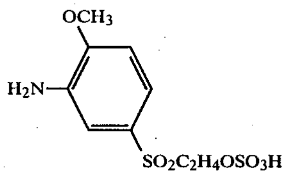 | " |

TABLE-continued
| Run No. | 1st | 2nd | 3rd |
|---|---|---|---|
| 95 | 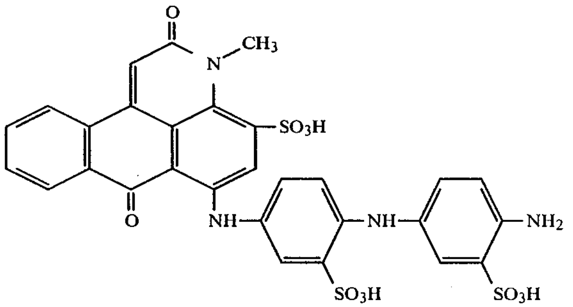 | 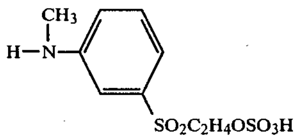 | Red |
| 96 | 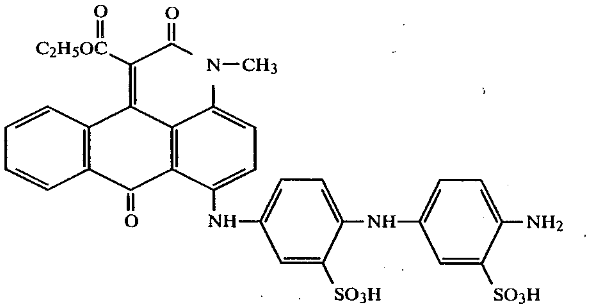 | 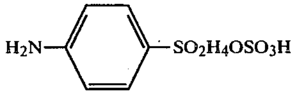 | " |
| 97 | 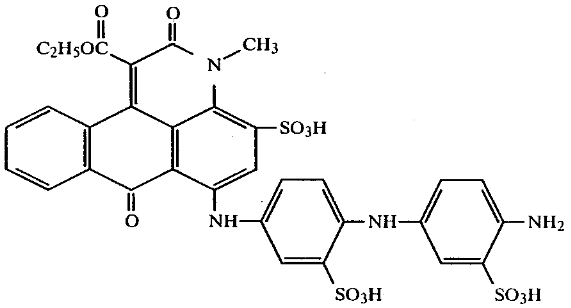 | 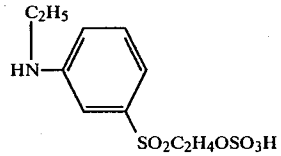 | " |

TABLE-continued
| Run No. | 1st | 2nd | 3rd |
| --- | --- | --- | --- |
| 98 | 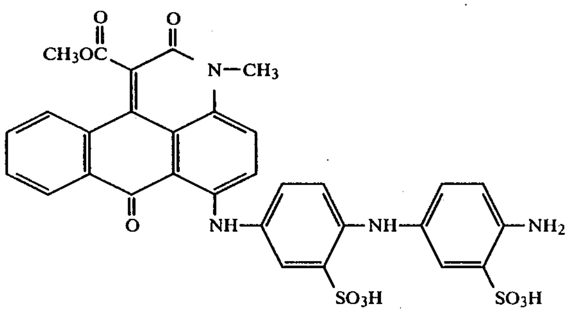 | 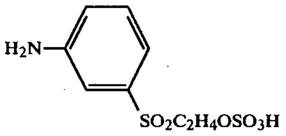 | " |
| 99 | 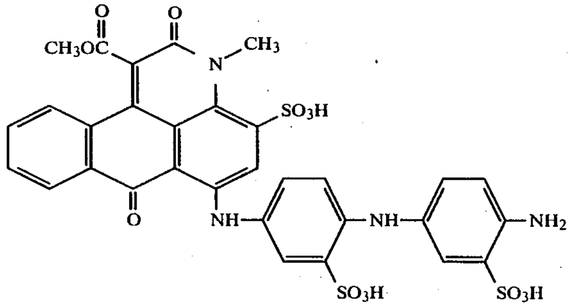 | 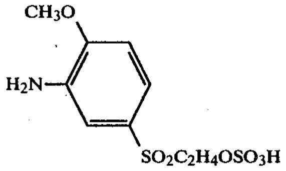 | Red |
| 100 | 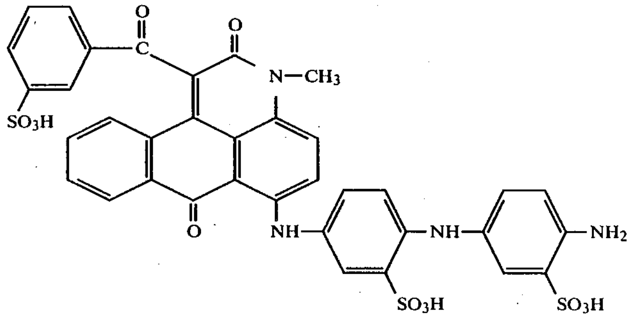 | 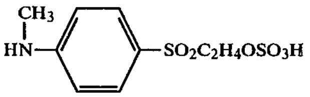 | " |

TABLE-continued
| Run No. | 1st | 2nd | 3rd |
| --- | --- | --- | --- |
| 101 | 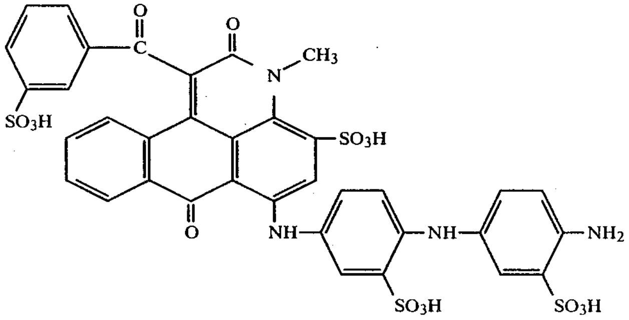 | 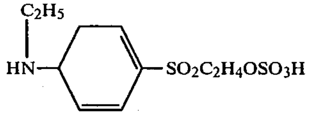 | " |
| 102 | 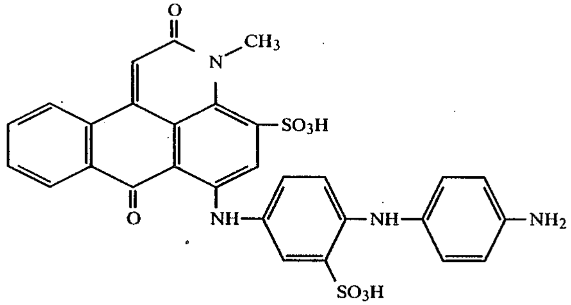 | 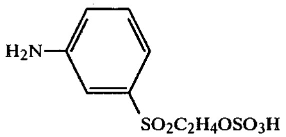 | " |
| 103 | 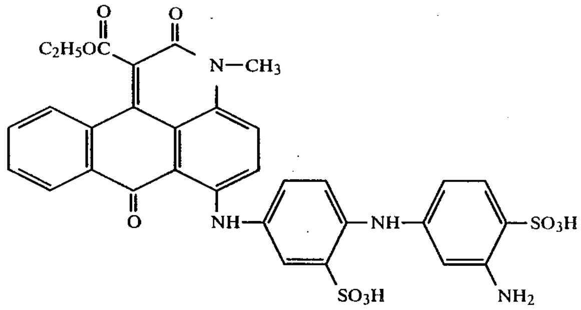 | 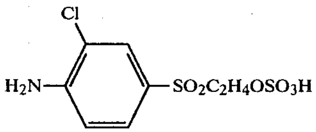 | " |

TABLE-continued
| Run No. | 1st | 2nd | 3rd |
| --- | --- | --- | --- |
| 104 | 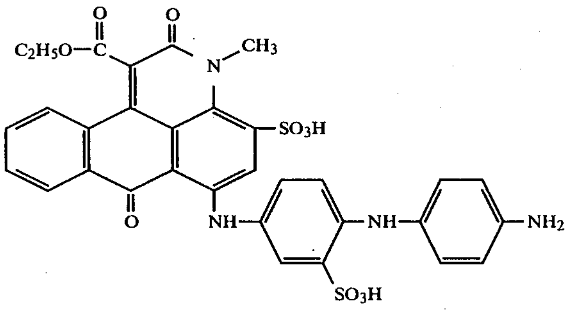 | 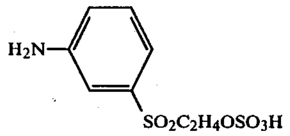 | Red |
| 105 | 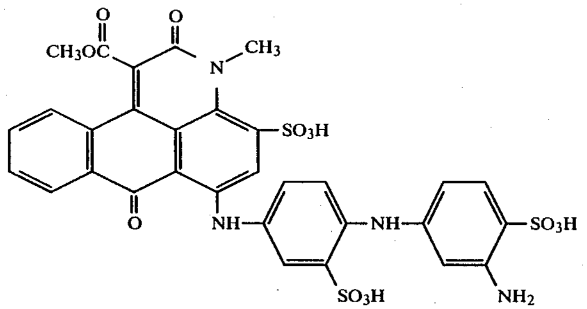 | 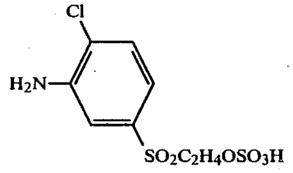 | " |
| 106 | 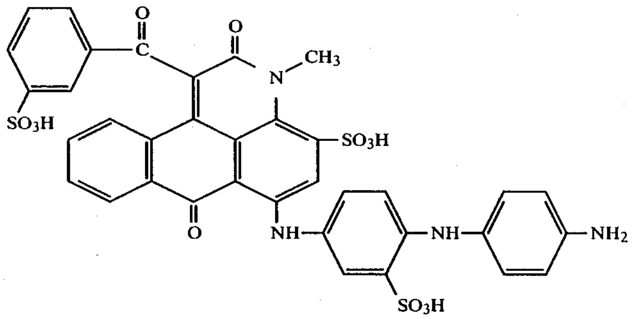 | 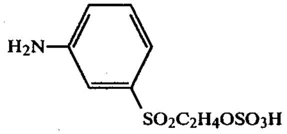 | " |

TABLE-continued
| Run No. | 1st | 2nd | 3rd |
|---|---|---|---|
| 107 | 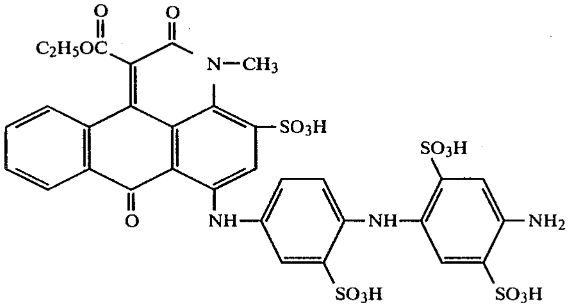 | 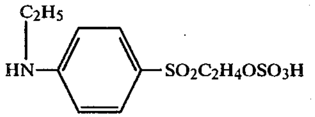 | " |
| 108 | 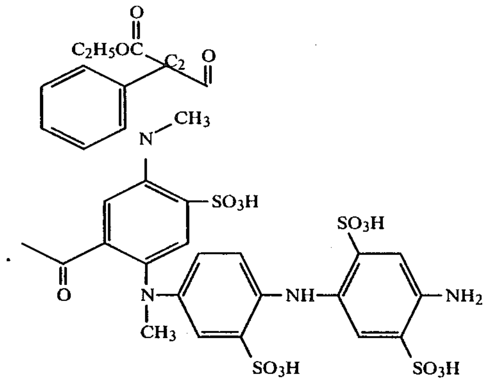 | 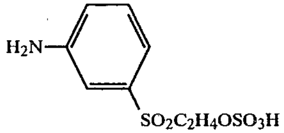 | Yellowish Red |
| 109 | 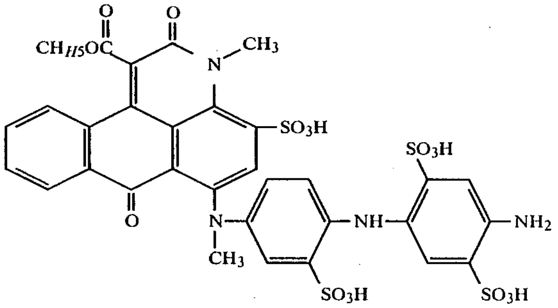 | 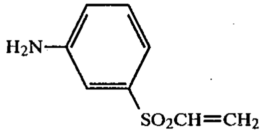 | Yellowish Red |

TABLE-continued
| Run No. | 1st | 2nd | 3rd |
|---|---|---|---|
| 110 | 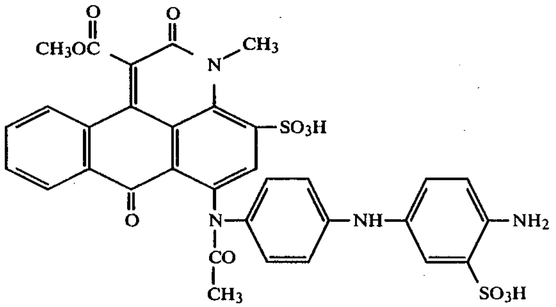 | 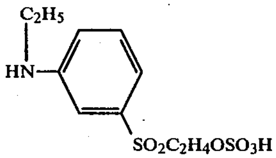 | Reddish yellow |
| 111 | 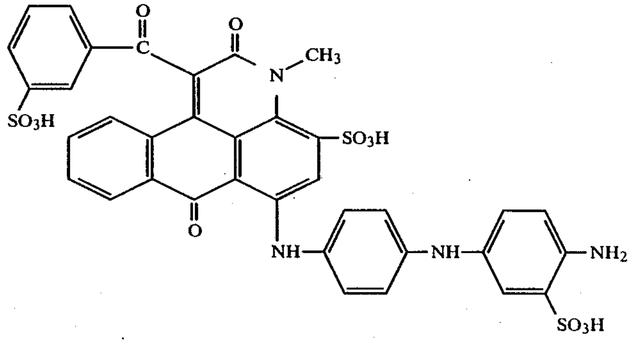 | 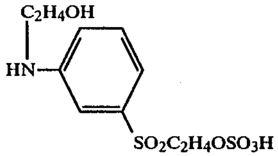 | Red |
| 112 | 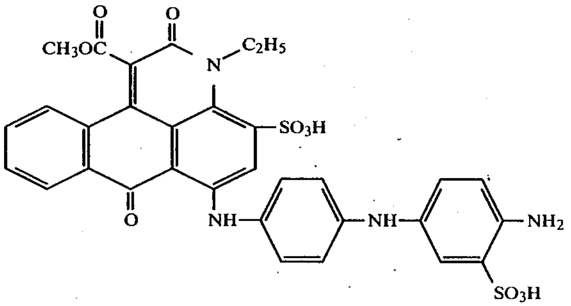 | 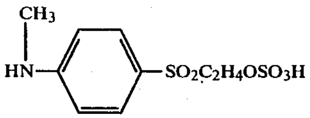 | " |

TABLE-continued
| Run No. | 1st | 2nd | 3rd |
| --- | --- | --- | --- |
| 113 | 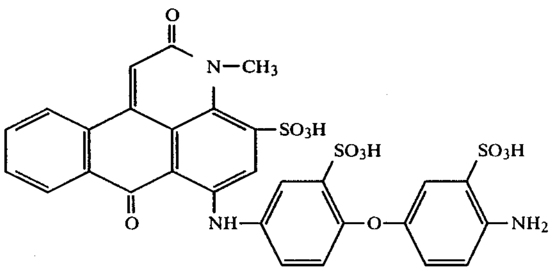 | 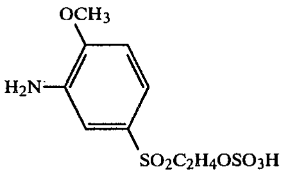 | " |
| 114 | 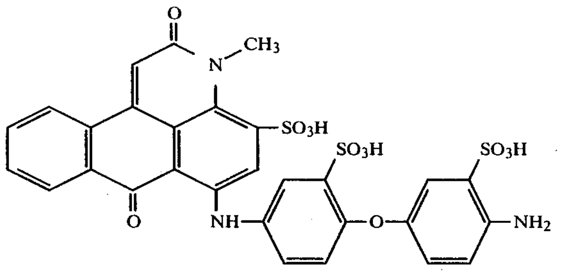 | 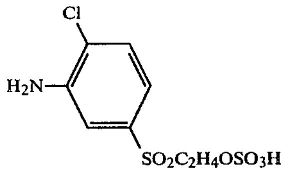 | Red |
| 115 | 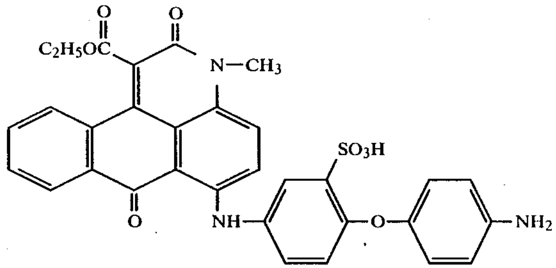 | 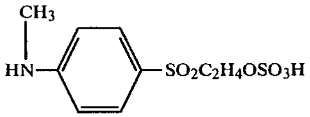 | " |

TABLE-continued
| Run No. | 1st | 2nd | 3rd |
|---|---|---|---|
| 116 | 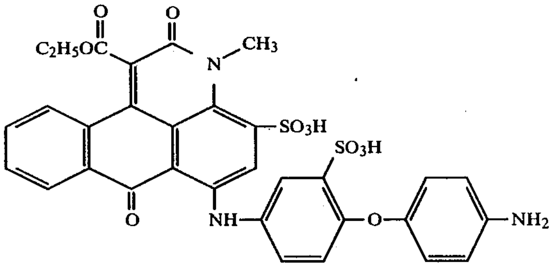 | 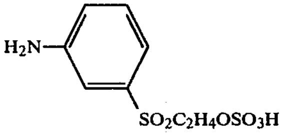 | " |
| 117 | 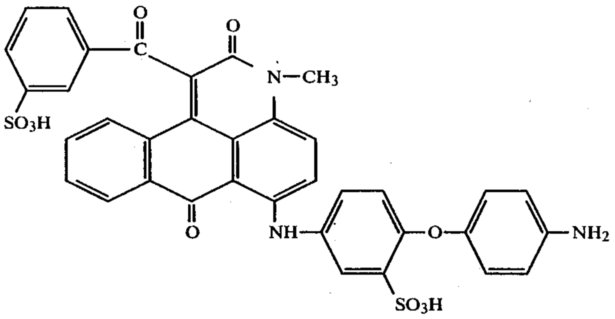 |  | " |
| 118 | 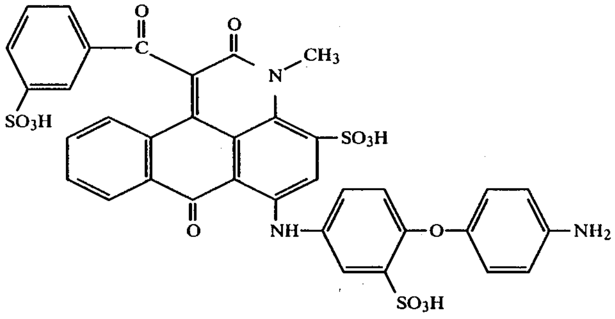 | 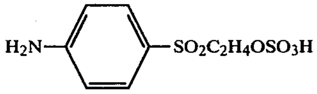 | " |

TABLE-continued
| Run No. | 1st | 2nd | 3rd |
|---|---|---|---|
| 119 | 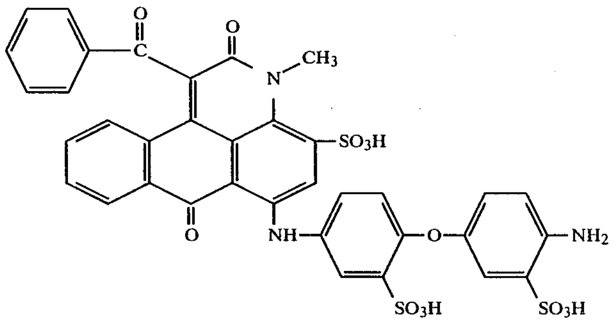 | 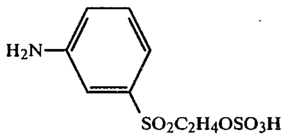 | Red |
| 120 | 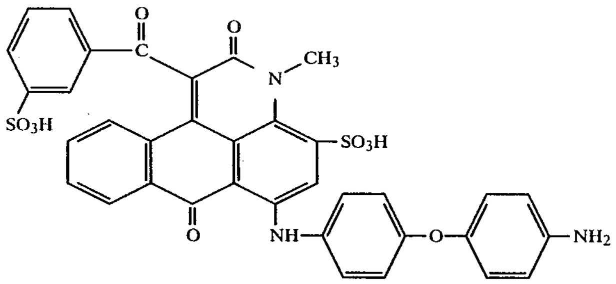 | 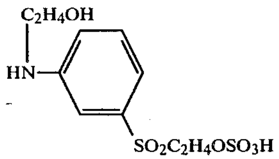 | " |
| 121 | 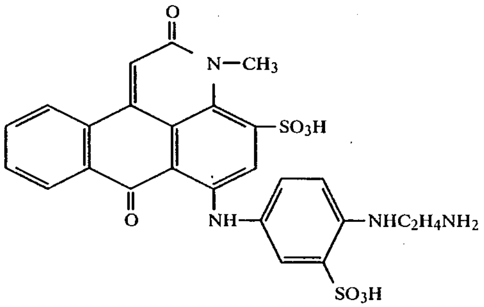 | 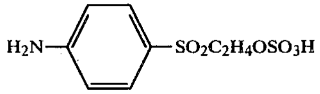 | " |

TABLE-continued
| Run No. | 1st | 2nd | 3rd |
|---|---|---|---|
| 122 | 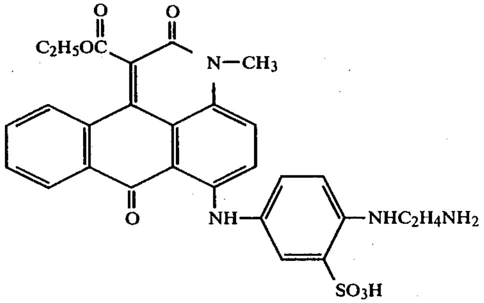 | " | " |
| 123 | 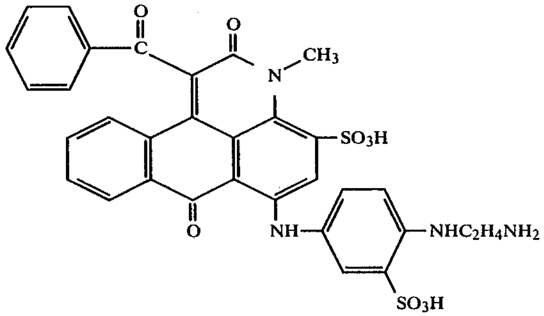 | 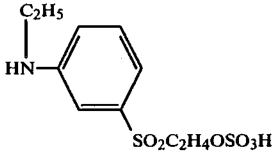 | " |
| 124 | 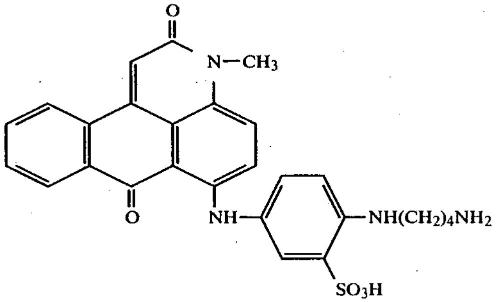 | 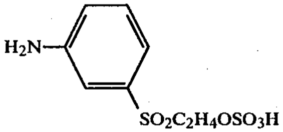 | Red |

EXAMPLE 3

4-(3'-Amino-2',4',6'-trimethyl-5'-sulfoanilino)-N-methylanthrapyridone (24.5 parts), cyanuric chloride (9.3 parts) and 1-aminobenzene-3-$\beta$-sulfatoethylsulfone (14.1 parts) were subjected to condensation reactions one after another in an aqueous medium in a usual manner, followed by condensation with aniline (4.7 parts) at 60° to 70° C. under weak acid conditions. Salting out of the reaction mixture gave an anthrapyridone compound of the following formula (free acid form).

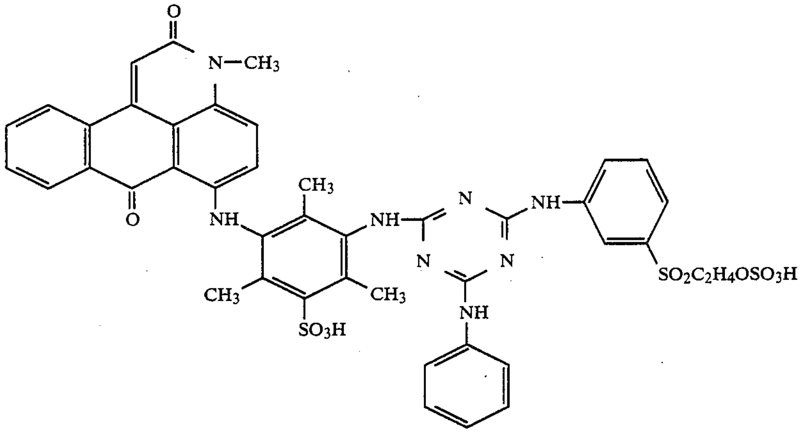

λmax 520 nm

Using the anthrapyridone compound, fiber materials, particularly cellulose fiber materials such as cotton can be dyed by the dyeing methods described hereinabove, for example, exhaustion dyeing method to obtain a dyed product in a red color excellent in light fastness, perspiration-light fastness, perspiration fastness and others with high exhaustion and fixation percentages and superior build-up property.

EXAMPLE 4

4-(3'-Amino-2',4',6'-trimethyl-5'-sulfoanilino)-N-methylanthrapyridone (24.5 parts), cyanuric chloride (9.3 parts) and 1-aminobenzene-3-$\beta$-sulfatoethylsulfone (14.1 parts) were subjected to condensation reactions one after another in an aqueous medium in a usual manner, followed by condensation with 1-aminobenzene-4-$\beta$-sulfatoethylsulfone (14.1 parts) at 60° to 70° C. under weak acid conditions. Then, salting out of the reaction mixture gave an anthrapyridone compound of the following formula (free acid form).

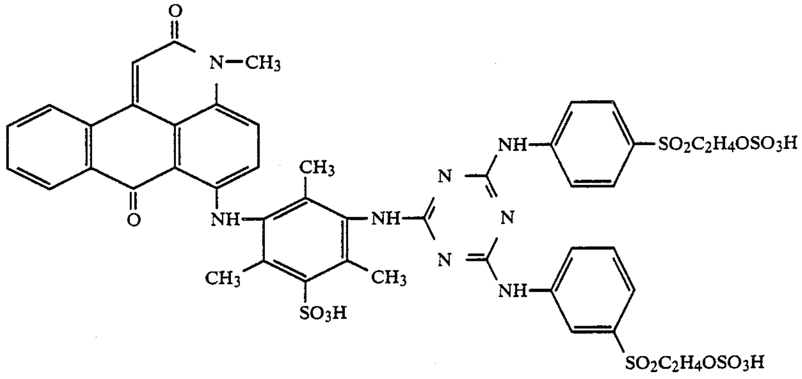

λmax 520 nm

Using the anthrapyridone compound, fiber materials, particularly cellulose fiber materials such as cotton can be dyed by the dyeing methods described hereinabove, for example, exhaustion dyeing method to obtain dyed product in a red color excellent in light fastness, perspiration-light fastness, perspiration fastness and others with high exhaustion and fixation percentages and superior build-up property.

EXAMPLE 5

4-(3'-Amino-2',4',6'-trimethyl-5'-sulfoanilino)-N-methylanthrapyridone (24.5 parts), cyanuric chloride (9.3 parts) and 1-aminobenzene-3-$\beta$-sulfatoethylsulfone (14.1 parts) were subjected to condensation reactions one after another in an aqueous medium in a usual manner, followed by condensation with nicotinic acid (6.2 parts) at 70° to 80° C. under weak acid conditions. Thereafter, the reaction mixture was adjusted to a pH within a weak acid region, and then salted out to obtain an anthrapyridone compound of the following formula (free acid form).

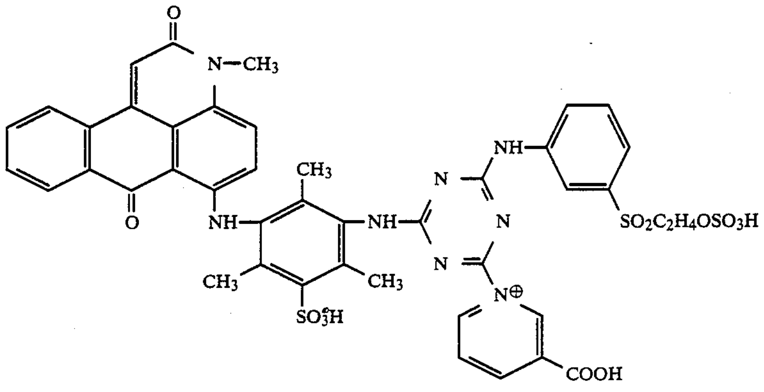

λmax 520 nm

Using the anthrapyridone compound, fiber materials, particularly cellulose fiber materials such as cotton can be dyed by the dyeing methods described hereinabove, for example, exhaustion dyeing method to obtain dyed product in a red color excellent in light fastness, perspiration-light fastness, perspiration fastness and others with high exhaustion and fixation percentages and superior build-up property.

EXAMPLE 6

Any one of Examples 3 to 5 was repeated, provided that the compounds shown in 1st, 2nd and 3rd columns of the following table were used in place of 4-(3'-amino-2',4',6'-trimethyl-5'-sulfoanilino)-N-methylanthrapyridone, 1-aminobenzene-3-β-sulfatoethylsulfone and any one of aniline, 1-aminobenzene-4-β-sulfatoethylsulfone and nicotinic acid, respectively, thereby obtaining a corresponding anthrapyridone compound. A color shade obtained by dyeing cotton using the said compound was as shown in a 4th column of the table.

TABLE
| Run No. | 1st | 2nd | 3rd | 4th |
|---|---|---|---|---|
| 1 | 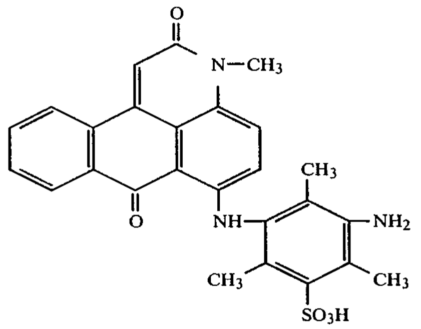 | 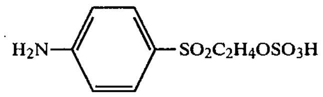 | 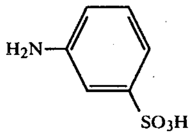 | Red |
| 2 | " | 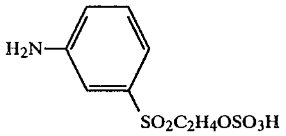 | 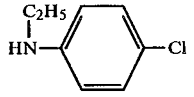 | " |
| 3 | " | 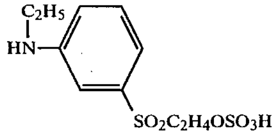 | 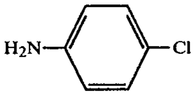 | " |
| 4 | " | 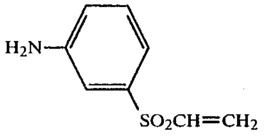 | 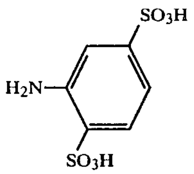 | " |

TABLE-continued
| Run No. | 1st | 2nd | 3rd | 4th |
|---|---|---|---|---|
| 5 | 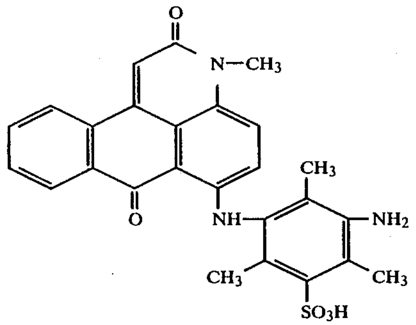 | 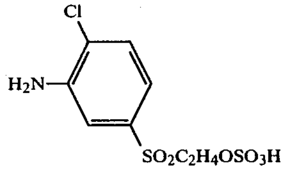 | $N(CH_3)_3$ | Red |
| 6 | 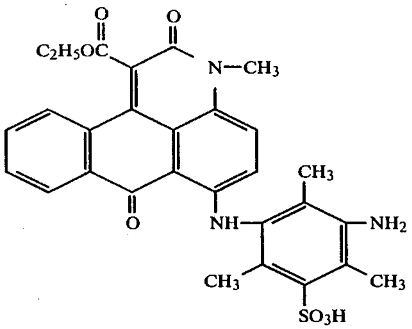 | 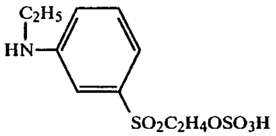 | 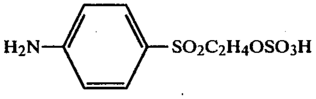 | " |
| 7 | " | 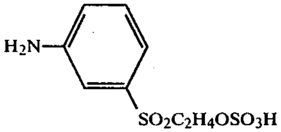 | 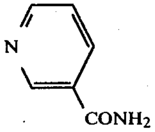 | " |
| 8 | " | 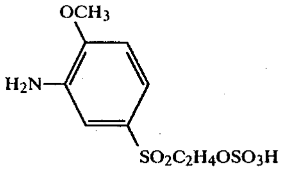 | 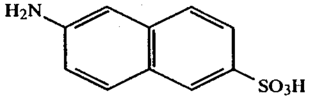 | " |

TABLE-continued
| Run No. | 1st | 2nd | 3rd | 4th |
|---|---|---|---|---|
| 9 | 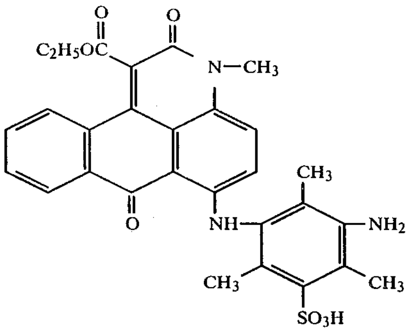 | 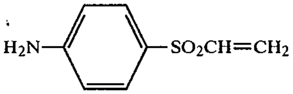 | 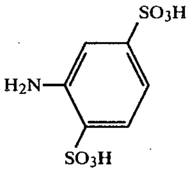 | Red |
| 10 | " | 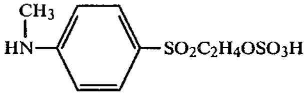 | 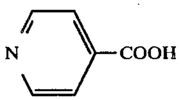 | " |
| 11 | 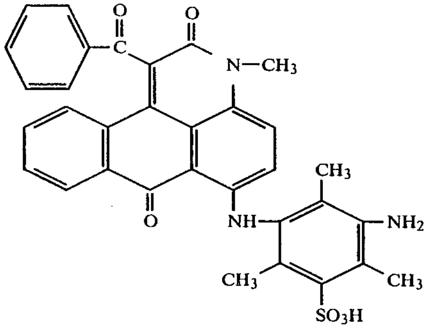 | 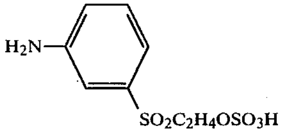 | 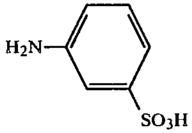 | " |
| 12 | " | 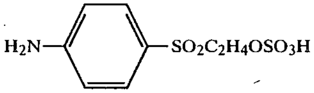 | 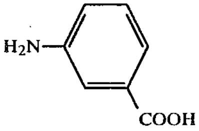 | " |

TABLE-continued
| Run No. | 1st | 2nd | 3rd | 4th |
|---|---|---|---|---|
| 13 | 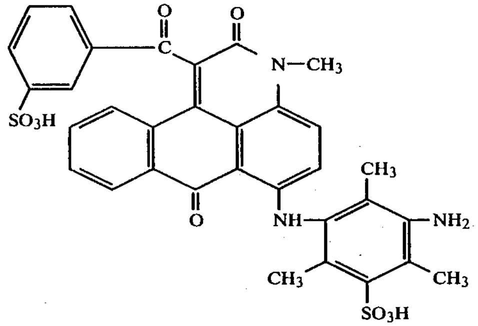 | 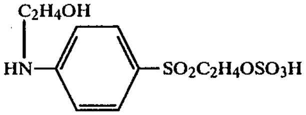 | 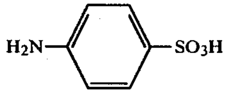 | Red |
| 14 | " | 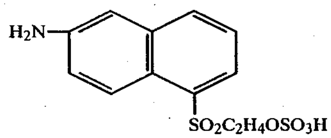 | 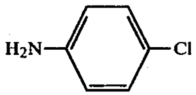 | " |
| 15 | " | 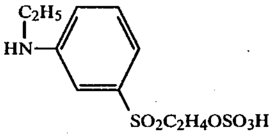 | $H_2NC_2H_4SO_3H$ | " |
| 16 | " | 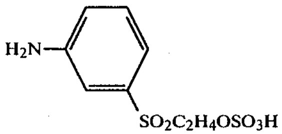 | 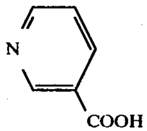 | " |

TABLE-continued
| Run No. | 1st | 2nd | 3rd | 4th |
|---|---|---|---|---|
| 17 | 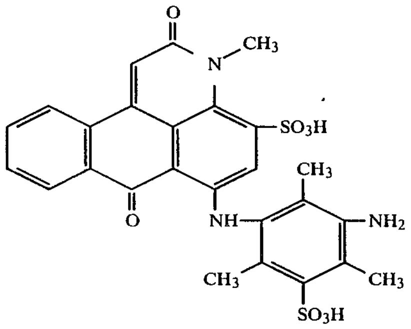 | 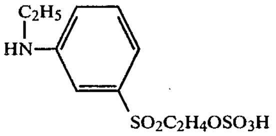 | 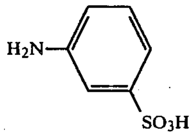 | Red |
| 18 | " | 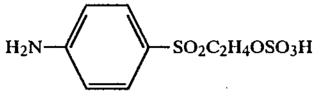 | 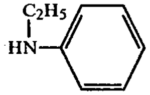 | " |
| 19 | 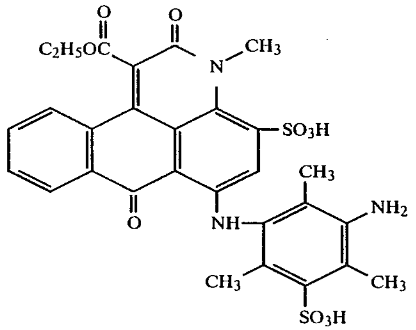 | 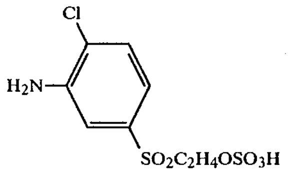 | 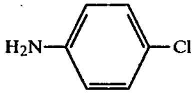 | " |

TABLE-continued
| Run No. | 1st | 2nd | 3rd | 4th |
| --- | --- | --- | --- | --- |
| 20 | 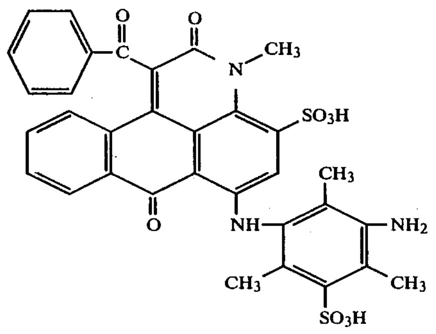 | 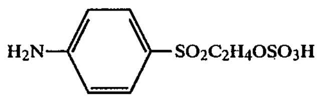 | 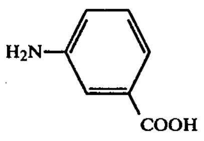 | Red |
| 21 | 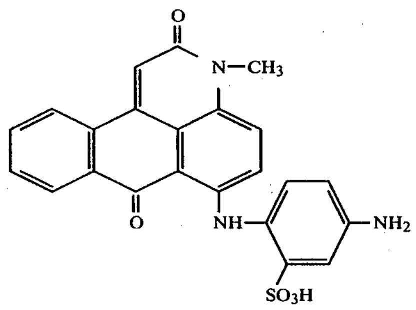 | 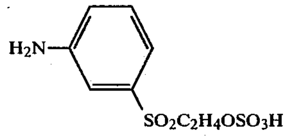 | 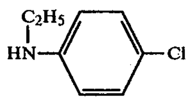 | " |
| 22 | " | 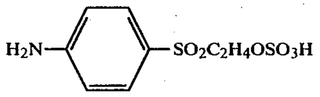 | 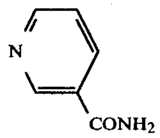 | " |

TABLE-continued
| Run No. | 1st | 2nd | 3rd | 4th |
|---|---|---|---|---|
| 23 | 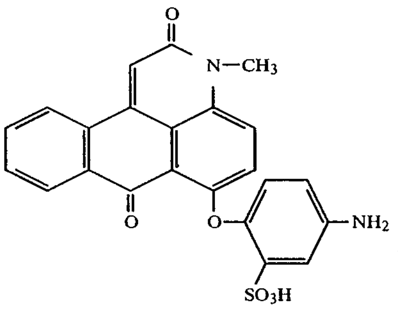 | 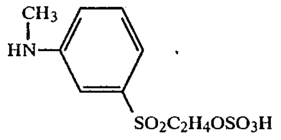 | 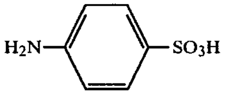 | Yellow |
| 24 | 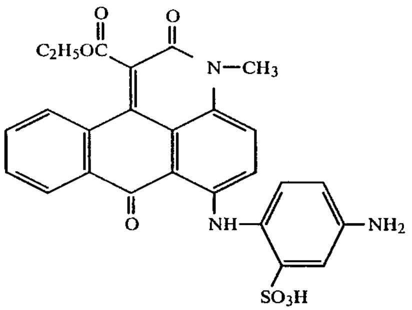 | 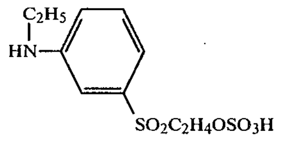 | 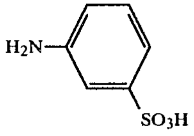 | Red |
| 25 | " | 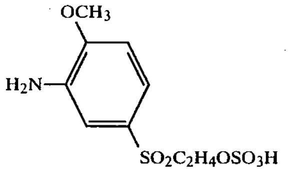 | 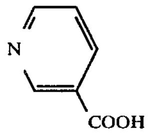 | " |
| 26 | " | 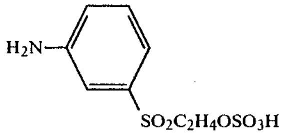 | 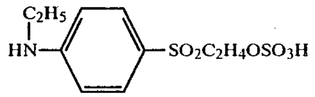 | |

TABLE-continued
| Run No. | 1st | 2nd | 3rd | 4th |
|---|---|---|---|---|
| 27 | 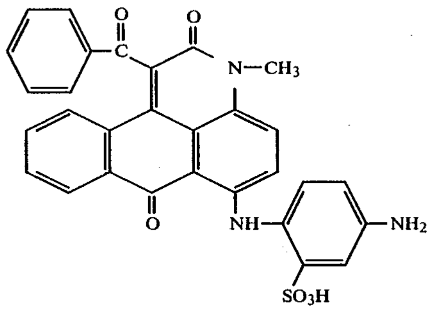 | 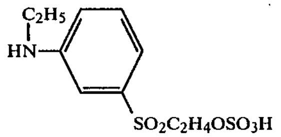 | 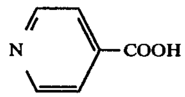 | " |
| 28 | 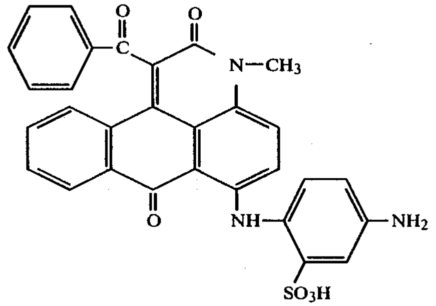 | 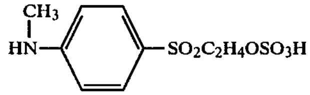 | $N(C_2H_5)_3$ | Red |
| 29 | 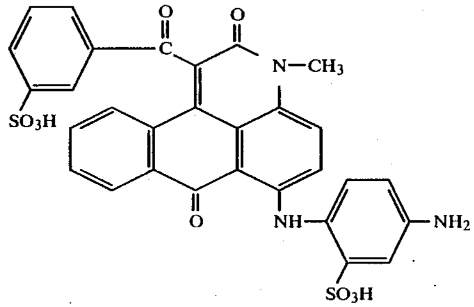 | 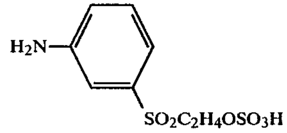 | 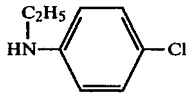 | " |

TABLE-continued
| N | st | 2nd | 3rd | 4th |
|---|---|---|---|---|
| 30 | 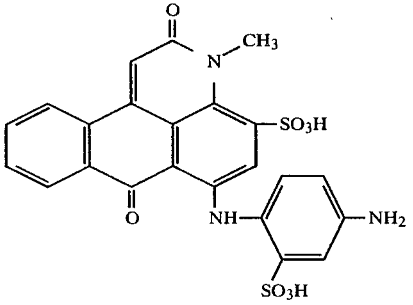 | 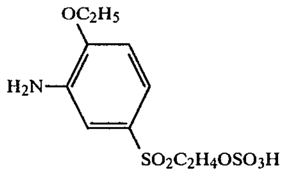 | | |
| | 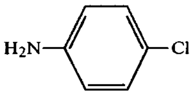 | " | | |
| 31 | 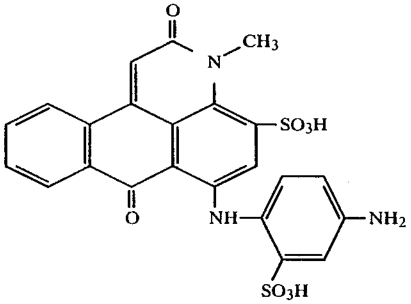 |  | $N(CH_3)_3$ | Red |
| 32 | " | 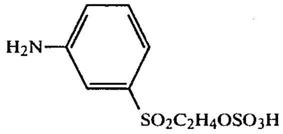 | 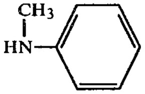 | " |

TABLE-continued
| Run No. | 1st | 2nd | 3rd | 4th |
| --- | --- | --- | --- | --- |
| 33 | 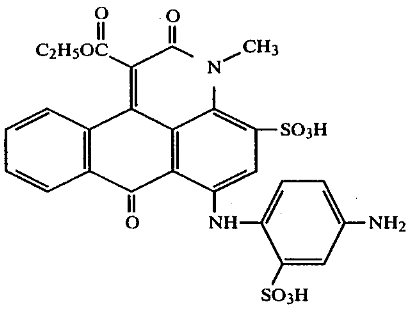 | 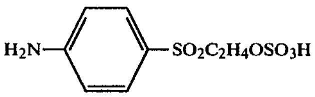 | 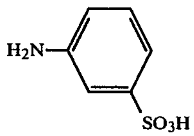 | " |
| 34 | " | 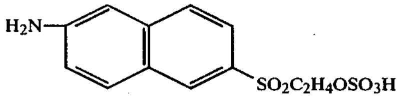 | 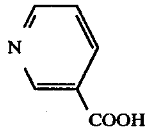 | " |
| 35 | 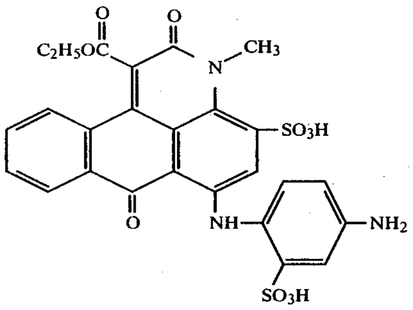 | 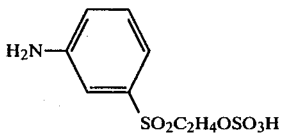 | 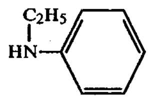 | Red |

TABLE-continued
| Run No. | 1st | 2nd | 3rd | 4th |
|---|---|---|---|---|
| 36 | 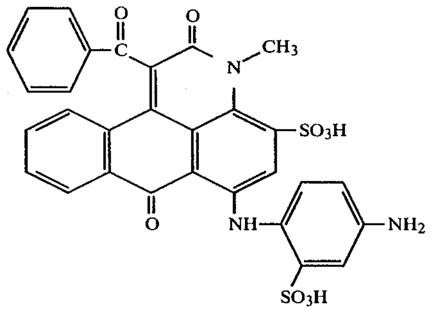 | 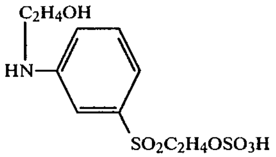 | 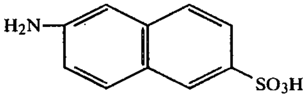 | " |
| 37 | 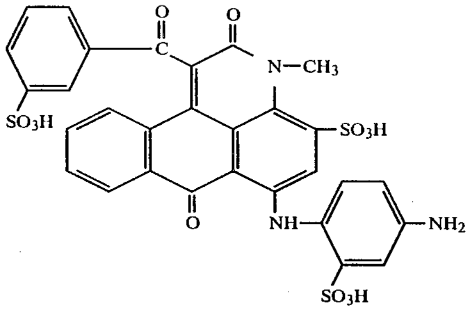 | 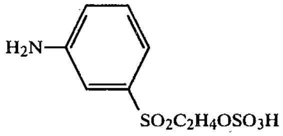 | 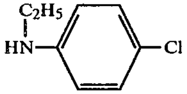 | " |
| 38 | 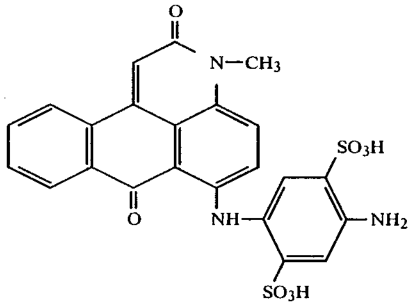 | 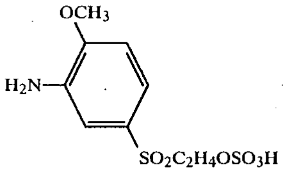 | 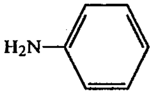 | Red |

TABLE-continued
| Run No. | 1st | 2nd | 3rd | 4th |
|---|---|---|---|---|
| 39 | 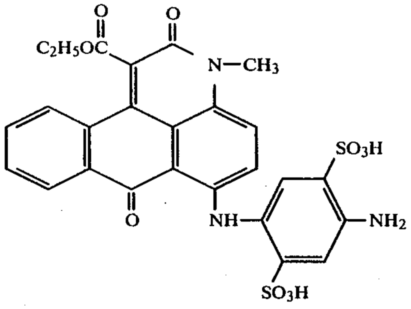 | 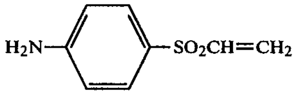 | 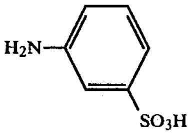 | " |
| 40 | 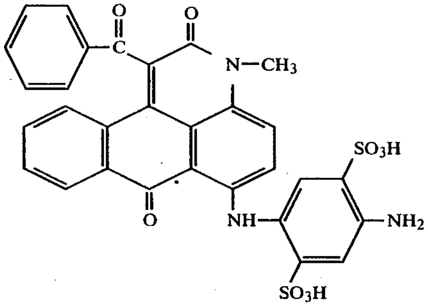 | 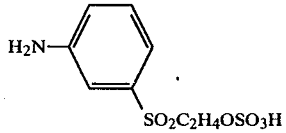 | 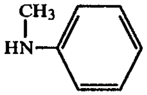 | " |
| 41 | 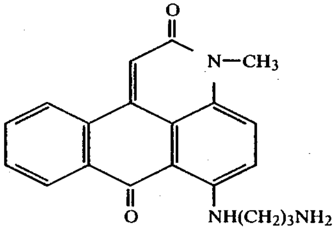 | 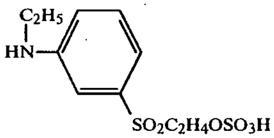 | 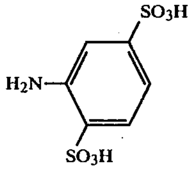 | Red |

TABLE-continued
| Run No. | 1st | 2nd | 3rd | 4th |
| --- | --- | --- | --- | --- |
| 42 | 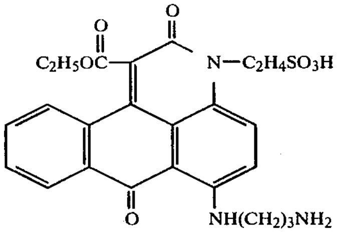 | 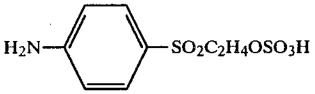 | 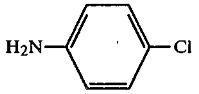 | " |
| 43 | 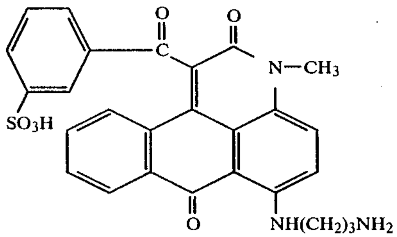 | 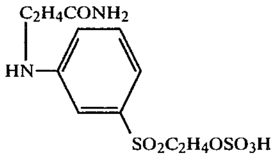 | 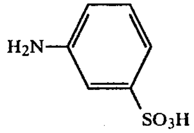 | " |
| 44 | 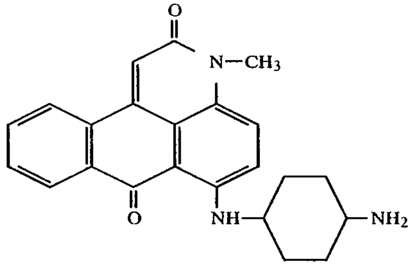 | 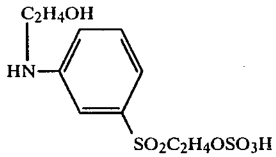 | 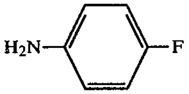 | " |
| 45 | 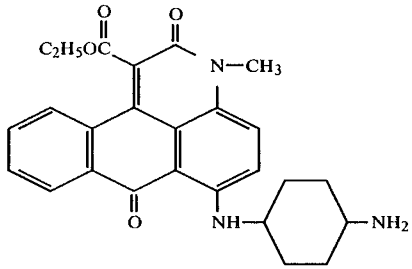 | 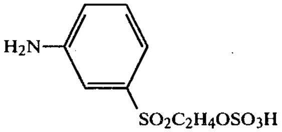 | 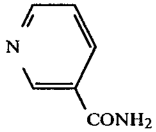 | Red |

TABLE-continued
| Run No. | 1st | 2nd | 3rd | 4th |
|---|---|---|---|---|
| 46 | 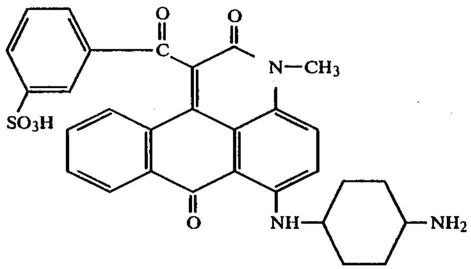 | 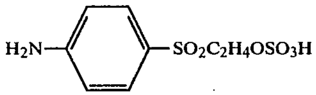 | $N(CH_3)_3$ | " |
| 47 | 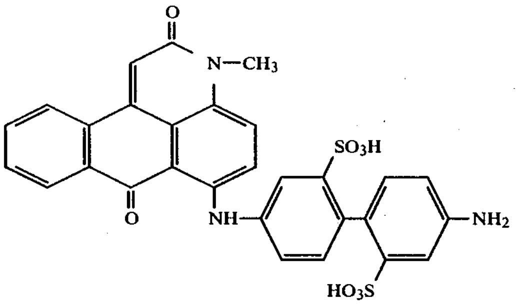 | 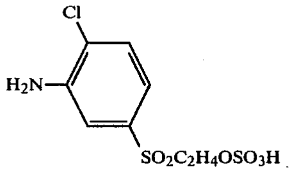 | 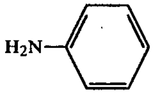 | " |
| 48 | 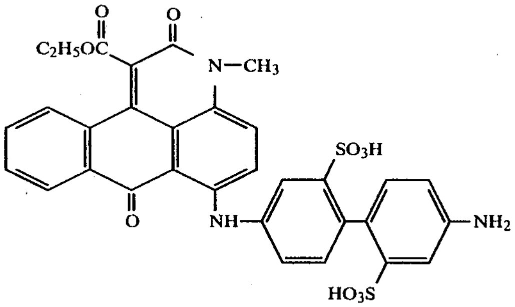 | 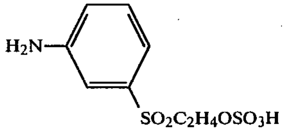 | 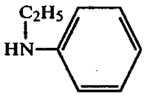 | Red |

TABLE-continued
| Run No. | 1st | 2nd | 3rd | 4th |
|---|---|---|---|---|
| 49 | 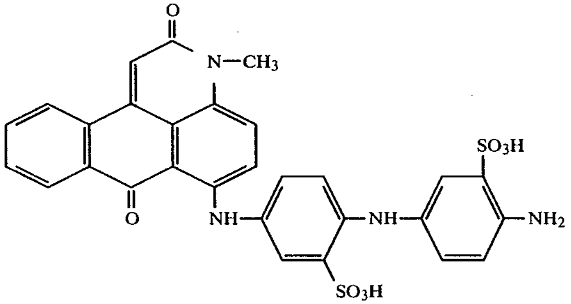 | 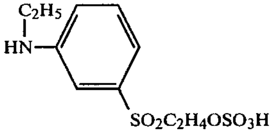 | 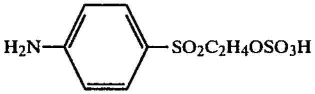 | |
| 50 | 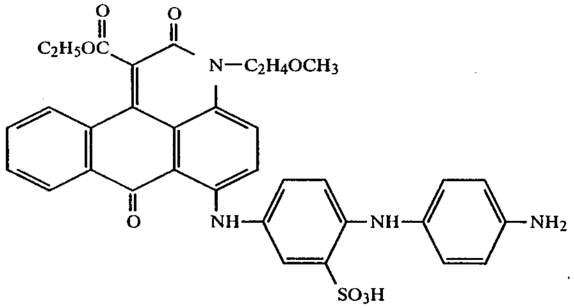 | 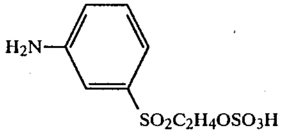 | 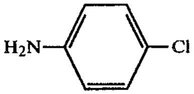 | " |
| 51 | 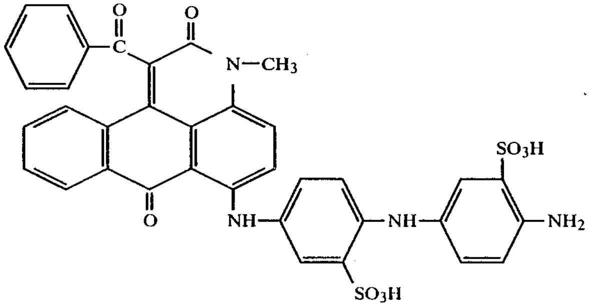 | 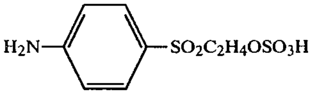 | 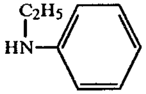 | Red |

TABLE-continued
| Run No. | 1st | 2nd | 3rd | 4th |
|---|---|---|---|---|
| 52 | 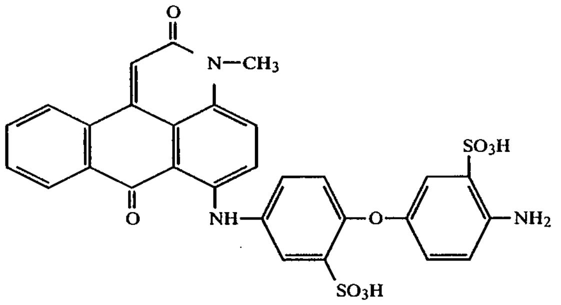 | 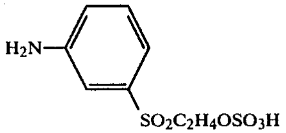 | 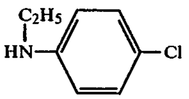 | " |
| 53 | 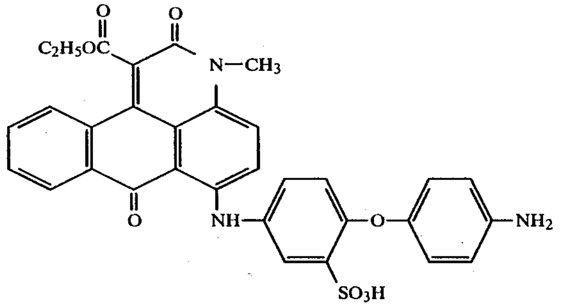 | 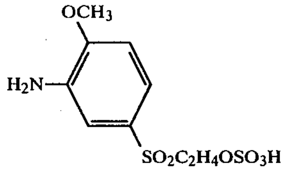 | 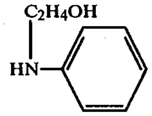 | " |
| 54 | 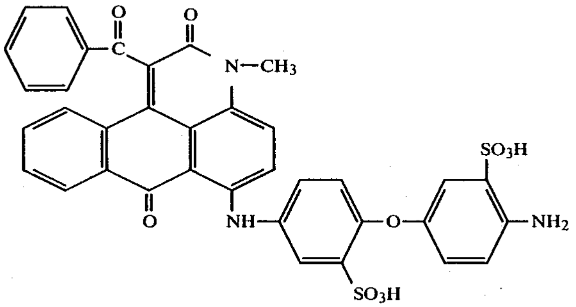 | 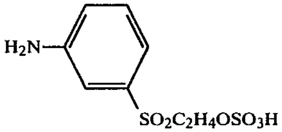 | 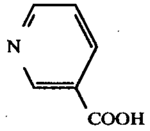 | Red |

TABLE-continued
| Run No. | 1st | 2nd | 3rd | 4th |
|---|---|---|---|---|
| 55 | 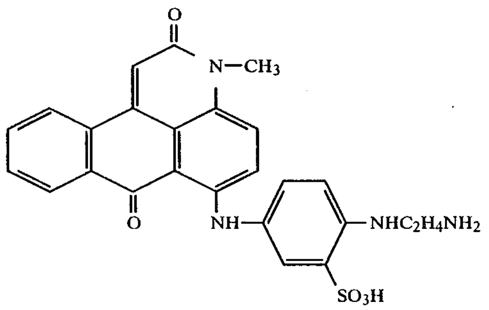 | 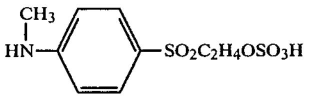 | 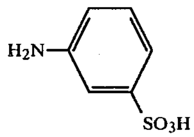 | " |
| 56 | 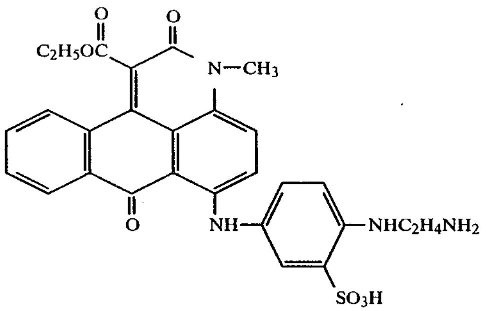 | 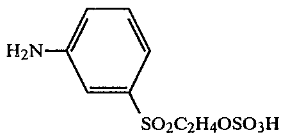 | $N(CH_3)_3$ | " |
| 57 | 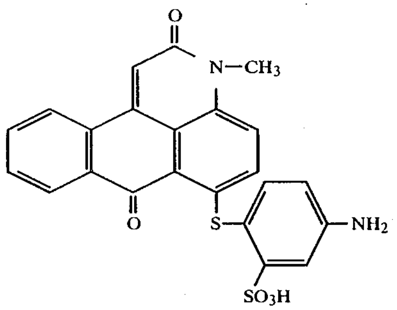 | 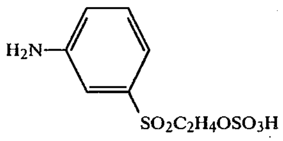 | 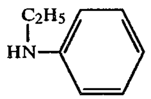 | Reddish yellow |

TABLE-continued
| Run No. | 1st | 2nd | 3rd | 4th |
|---|---|---|---|---|
| 58 | 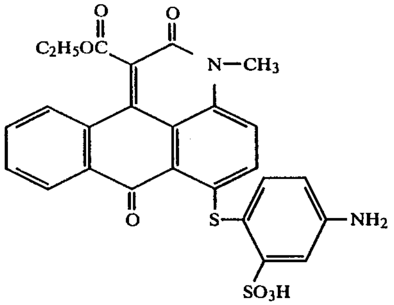 | " | 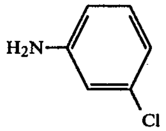 | Reddish yellow |
| 59 | 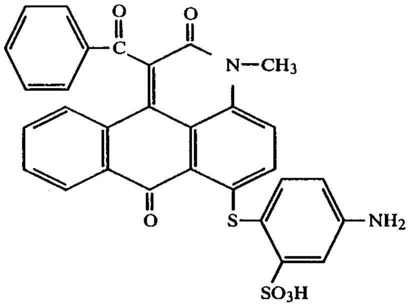 | 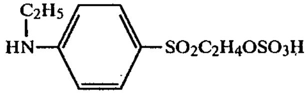 | 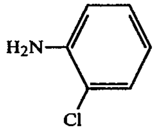 | Reddish yellow |
| 60 | 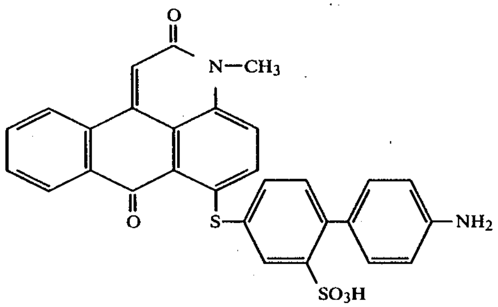 | 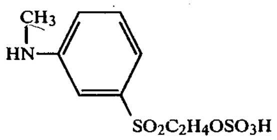 | 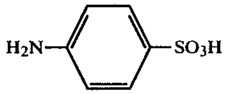 | Reddish yellow |

DYEING EXAMPLE 1

The anthrapyridone compound obtained in Example 1 (each 0.1, 0.3 and 0.6 part) was dissolved in water (200 parts), respectively, and sodium sulfate (20 parts) and cotton (10 parts) were added thereto. The bath was heated to 60° C. 30 Minutes thereafter, sodium carbonate (3 parts) was added thereto. Dyeing was continued at that temperature for 1 hour. Thereafter, the cotton taken out was washed with water, soaped and dried to obtain each dyed product of a red color superior in fastness properties, particularly light and perspiration-light fastness. In the above, the anthrapyridone compound was found to be superior in build-up property and solubility, and exhibited superior level-dyeing property and reproducibility of the dyeing.

DYEING EXAMPLE 2

The anthrapyridone compound obtained in Run No. 4 of Example 2 (0.3 part) was dissolved in water (200 parts), and sodium sulfate (20 parts) and cotton (10 parts) were added thereto. The bath was heated to 60° C. 20 Minutes thereafter, trisodium phosphate (3 parts) was added thereto. Dyeing was continued for 1 hour at that temperature. Thereafter, the cotton taken out was washed with water, soaped and then dried to obtain a product dyed in a red color excellent in various fastness properties.

DYEING EXAMPLE 3

The anthrapyridone compound obtained in Example 3 (each 0.1, 0.3 and 0.6 part) was dissolved in water (200 parts), respectively, and sodium sulfate (30 parts) and cotton (10 parts) were added thereto. The bath was heated to 70° C. 30 Minutes thereafter, sodium carbonate (3 parts) was added thereto, and dyeing was continued for 1 hour at that temperature. Thereafter, the cotton taken out was washed with water and soaped to obtain a product dyed in a red color excellent in fastness properties, particularly light fastness and perspiration-light fastness. In the above, the compound was found to be superior in build-up property and solubility, and exhibited superior level-dyeing property and reproducibility.

DYEING EXAMPLE 4

The anthrapyridone compound obtained in Example 4 (0.3 part) was dissolved in water (200 parts), and then sodium sulfate (30 parts) and cotton (10 parts) were added thereto. The bath was heated to 70° C., and 20 minutes thereafter, trisodium phosphate (3 parts) was added thereto. Dyeing was continued for 1 hour at that temperature. Thereafter, the cotton taken out was washed with water and soaped to obtain a product dyed in a red color excellent in various fastness properties.

DYEING EXAMPLE 5

| Composition of color paste | |
|---|---|
| Anthrapyridone compound obtained in Example 1 | 5 parts |
| Urea | 5 parts |
| Sodium alginate (5%), a thickener | 50 parts |
| Hot water | 25 parts |
| Sodium hydrogencarbonate | 2 parts |
| Balance (water) | 13 parts |

Mercerized cotton broad cloth was printed with the color paste of the above composition, pre-dried, steamed at 100° C. for 5 minutes, washed with hot water, soaped, again washed with hot water and then dried to obtain a product printed in a red color excellent in various fastness properties.

We claim:

1. A compound of the formula (I)

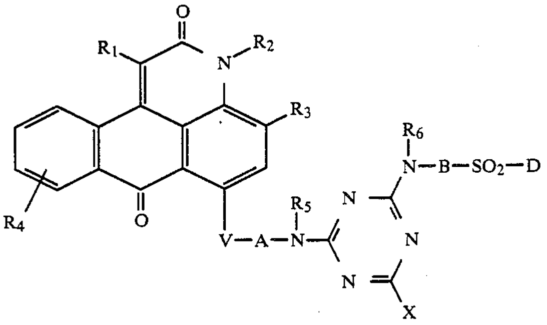

(I)

wherein $R_1$ is hydrogen, benzoyl unsubstituted or substituted once or twice by $C_1$–$C_4$ alkoxy, sulfo, carboxy, chloro or $C_1$–$C_4$ alkyl, acetyl or alkyloxycarbonyl in which the alkyl moiety has 1 to 4 carbon atoms; $R_2$ is hydrogen or alkyl having 1 to 4 carbon atoms unsubstituted or substituted by hydroxy; $R_3$ is hydrogen, halo, sulfo, phenoxy unsubstituted or substituted once or twice by $C_1$–$C_4$ alkoxy, sulfo, carboxy, chloro or $C_1$–$C_4$ alkyl, phenylthio unsubstituted or substituted once or twice by $C_1$–$C_4$ alkoxy, sulfo, carboxy, chloro or $C_1$–$C_4$ alkyl, or alkoxy having 1 to 4 carbon atoms; $R_4$ is hydrogen, halo or sulfo; $R_5$ is hydrogen or methyl; $R_6$ is hydrogen or alkyl having 1 to 3 carbon atoms unsubstituted or substituted by hydroxy, carboxy or carbamoyl; V is —O—, —S— or $$-\underset{}{\overset{R_7}{\overset{|}{N}}}-$$

in which $R_7$ is hydrogen, acetyl or methyl; B is phenylene unsubstituted or substituted once or twice by methyl, ethyl, methoxy, ethoxy, chloro, bromo, carboxy, sulfo or nitro, or naphthylene unsubstituted or substituted by sulfo; D is vinyl or —$CH_2CH_2L$ in which L is a group capable of being split by the action of an alkali; A is a divalent group of the following formula (1), (2), (3), (4), (5) or (6), the formula (1) being

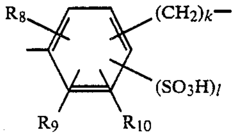

(1)

wherein $R_8$, $R_9$ and $R_{10}$ are independently each hydrogen, methyl, ethyl, methoxy, ethoxy, halo or carboxy, k is 0 or 1 and l is 0, 1 or 2, the formula (2) being

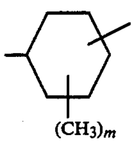

(2)

wherein m is 0, 1, 2 or 3, the formula (3) being $$-(CH_2)_n- \quad (3)$$

wherein n is an integer of 2 to 6, the formula (4) being

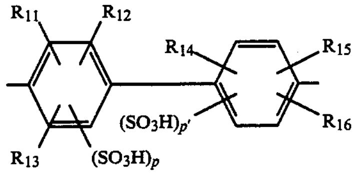

(4)

wherein $R_{11}$, $R_{12}$, $R_{13}$, $R_{14}$, $R_{15}$ and $R_{16}$ are each hydrogen, and p and p' are each 0, 1 or 2, provided that the sum of p and p' is 1 or 2, the formula (5) being

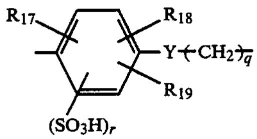

(5)

wherein $R_{17}$, $R_{18}$ and $R_{19}$ are each hydrogen, Y is —NH—, q is an integer of 2 to 6, and r is 0, 1 or 2 and the formula (6) being

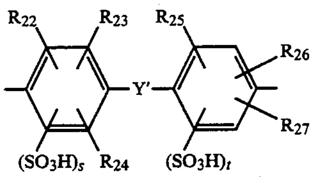

(6)

wherein $R_{22}$, $R_{23}$, $R_{24}$, $R_{25}$, $R_{26}$ and $R_{27}$ are each hydrogen, Y' is —O—, or —NH—, and s and t are each 0, 1 or 2; and X is fluoro, chloro or a group of the following formula (7), (8), (9) or (10), the formula (7) being

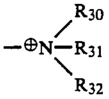

(7)

wherein $R_{30}$, $R_{31}$ and $R_{32}$ are independently each alkyl having 1 to 4 carbon atoms, the formula (8) being

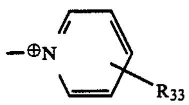

(8)

wherein $R_{33}$ is hydrogen, chloro, cyano, hydroxy, vinyl, carbamoyl, β-hydroxyethyl or carboxy, the formula (9) being

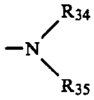

(9)

wherein $R_{34}$ and $R_{35}$ are independently each hydrogen, alkyl having 1 to 4 carbon atoms unsubstituted or substituted once or twice by $C_1$–$C_4$ alkoxy, sulfo, carboxy, hydroxy, chloro, phenyl or sulfato, phenyl unsubstituted or substituted once or twice by $C_1$–$C_4$ alkyl, $C_1$–$C_4$ alkoxy, sulfo, carboxy, or chloro, naphthyl unsubstituted or substituted once or twice or three times by hydroxy, carboxy, sulfo, $C_1$–$C_4$ alkoxy or chloro, or benzyl unsubstituted or substituted once or twice by $C_1$–$C_4$ alkyl, $C_1$–$C_4$ alkoxy, sulfo or chloro, and the formula (10) being $$-\overset{R_{36}}{\overset{|}{N}}-B'-SO_2-D' \quad (10)$$

wherein $R_{36}$ is hydrogen, methyl or ethyl, B' is phenylene unsubstituted or substituted once or twice by methyl, ethyl, methoxy, ethoxy, chloro, bromo, carboxy, sulfo or nitro, or naphthylene unsubstituted or substituted by sulfo, and D' is vinyl or $—CH_2CH_2L$ in which L is as defined hereinabove, with the proviso that at least one of $R_1$, $R_3$, A and B is or has sulfo.

2. The compound according to claim 1, wherein both $R_1$ and $R_4$ are hydrogen.

3. The compound according to claim 1, wherein $R_3$ is hydrogen or sulfo.

4. The compound according to claim 1, wherein $R_2$ is methyl, ethyl or hydroxyethyl.

5. The compound according to claim 1, wherein $R_5$ is hydrogen or methyl, and $R_6$ is hydrogen, methyl or ethyl.

6. The compound according to claim 1, wherein V is —S— or —NH—.

7. The compound according to claim 1, wherein A is a divalent group of the formula (1) in which $R_8$, $R_9$ and $R_{10}$ are independently each hydrogen or methyl, k is 0 or 1, and l is 1, the formula (2) in which m is 0, 1 or 2, the formula (3) in which n is 2, 3 or 4, the formula (4) in which p and p' are each 1, the formula (5) in which, q is 2, 3 or 4 and r is 1, or the formula (6) wherein s and t are each 0 or 1.

8. The compound according to claim 1, wherein X is chloro, fluoro or a group of the formula (7) in which both $R_{30}$ and $R_{31}$ are methyl, and $R_{32}$ is $C_1$–$C_4$ alkyl, the formula (8) in which $R_{33}$ is carbamoyl or carboxy, the formula (9) in which $R_{34}$ is hydrogen, methyl or ethyl, and $R_{35}$ is phenyl unsubstituted or substituted once or twice by sulfo, carboxy or chloro, or sulfonaphthyl, or the formula (10) in which $R_{36}$ is hydrogen, methyl or ethyl, B' is phenylene unsubstituted or substituted by methyl or methoxy or naphthylene unsubstituted or substituted by sulfo, and D' is vinyl or β-sulfatoethyl.

9. The compound according to claim 1, wherein D is vinyl or β-sulfatoethyl.

10. A process for producing the compound of the formula (I) as defined in claim 1, which comprises reacting a compound of the formula (II), a compound of the formula (III) and cyanuric chloride or fluoride in an optional order, if necessary, followed by reaction with any one of compounds of the formulas (IV) to (VII), the formula (II) being

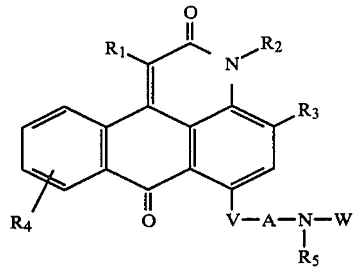

(II)

wherein $R_1$, $R_2$, $R_3$, $R_4$, $R_5$, V and A are as defined in claim 1, and W is hydrogen or an amino-protecting group,
the formula (III) being

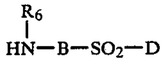

(III)

wherein $R_6$, B and D are as defined in claim 1,
the formula (IV) being

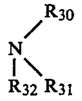

(IV)

wherein $R_{30}$, $R_{31}$ and $R_{32}$ are as defined in claim 1,
the formula (V) being

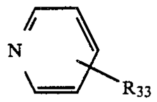

(V)

wherein $R_{33}$ is as defined in claim 1,
the formula (VI) being

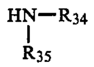

(VI)

wherein $R_{34}$ and $R_{35}$ are as defined in claim 1,
the formula (VII) being

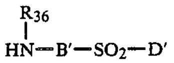

(VII)

wherein $R_{36}$, B' and D' are as defined in claim 1.

11. A process for dyeing or printing fiber materials, which comprises using the compound of the formula (I) as defined in claim 1.

12. Fiber materials dyed or printed by the process as defined in claim 11.

* * * * *